(12) United States Patent
Kamiya et al.

(10) Patent No.: US 9,346,442 B2
(45) Date of Patent: May 24, 2016

(54) CYLINDER DEVICE AND HYDRAULIC BRAKE SYSTEM

(71) Applicants: Yusuke Kamiya, Okazaki (JP); Akira Sakai, Toyota (JP); Kiyoyuki Uchida, Konan (JP); Masaki Maruyama, Nagoya (JP); Yoshio Masuda, Kariya (JP); Hiroaki Niino, Toyota (JP); Takashi Kurokawa, Nagoya (JP)

(72) Inventors: Yusuke Kamiya, Okazaki (JP); Akira Sakai, Toyota (JP); Kiyoyuki Uchida, Konan (JP); Masaki Maruyama, Nagoya (JP); Yoshio Masuda, Kariya (JP); Hiroaki Niino, Toyota (JP); Takashi Kurokawa, Nagoya (JP)

(73) Assignees: TOYOTA JIDOSHA KABUSHIKI KAISHA, Toyota-shi (JP); ADVICS CO., LTD., Kariya (JP)

( * ) Notice: Subject to any disclaimer, the term of this patent is extended or adjusted under 35 U.S.C. 154(b) by 15 days.

(21) Appl. No.: 14/389,524

(22) PCT Filed: Mar. 27, 2013

(86) PCT No.: PCT/IB2013/000520
§ 371 (c)(1),
(2) Date: Sep. 30, 2014

(87) PCT Pub. No.: WO2013/144702
PCT Pub. Date: Oct. 3, 2013

(65) Prior Publication Data
US 2015/0120161 A1    Apr. 30, 2015

(30) Foreign Application Priority Data
Mar. 30, 2012   (JP) ................... 2012-080104

(51) Int. Cl.
*B60T 11/16*     (2006.01)
*B60T 7/08*      (2006.01)
(Continued)

(52) U.S. Cl.
CPC ............... *B60T 11/165* (2013.01); *B60T 7/042* (2013.01); *B60T 7/085* (2013.01); *B60T 8/4077* (2013.01); *B60T 13/662* (2013.01); *B60T 13/686* (2013.01)

(58) Field of Classification Search
CPC ..... B60T 11/165; B60T 7/085; B60T 8/4077; B60T 13/686; B60T 7/042; B60T 13/662
See application file for complete search history.

(56) References Cited

U.S. PATENT DOCUMENTS

| 9,168,899 B2* | 10/2015 | Miyata ............... B60T 7/042 |
| 2001/0025750 A1* | 10/2001 | Oishi ............... B60T 7/042 188/151 R |
| 2005/0110338 A1* | 5/2005 | Tsunehara ............ B60T 13/167 303/10 |

(Continued)

FOREIGN PATENT DOCUMENTS

| JP | 2009-507714 A | 2/2009 |
| JP | 2011-156998 | 8/2011 |

OTHER PUBLICATIONS

International Search Report Issued Oct. 2, 2013 in PCT/IB13/000520 Filed Mar. 27, 2013.

*Primary Examiner* — Jerrah Edwards
*Assistant Examiner* — Frederick Brushaber
(74) *Attorney, Agent, or Firm* — Oblon, McClelland, Maier & Neustadt, L.L.P.

(57) ABSTRACT

When a brake switch is switched from OFF to ON, current is applied to a brake ECU, and a command to switch a master cylinder from a second state to a first state is issued after a lapse of preparation time, so that switching-time change suppression control is performed. A reservoir shutoff valve is closed, and duty control is performed on a communication control valve. The duty ratio is set to 1 when a switching-time control duration expires, and the communication control valve is placed in an open position, to establish the first state. Thus, since the communication control valve is duty-controlled during switching from the second state to the first state, change in the hydraulic pressure of an input chamber is suppressed, and change of the operating feeling is suppressed.

11 Claims, 12 Drawing Sheets

(51) Int. Cl.
*B60T 8/40* (2006.01)
*B60T 13/68* (2006.01)
*B60T 7/04* (2006.01)
*B60T 13/66* (2006.01)

(56) References Cited

U.S. PATENT DOCUMENTS

| | | | |
|---|---|---|---|
| 2008/0257670 A1 | 10/2008 | Drumm et al. | |
| 2009/0026835 A1* | 1/2009 | Matsubara | B60T 7/12 303/15 |
| 2010/0191400 A1* | 7/2010 | Ajiro | B60T 1/10 701/22 |
| 2011/0138802 A1* | 6/2011 | Sakuma | B60T 7/042 60/545 |
| 2012/0074769 A1* | 3/2012 | Sakata | B60T 13/145 303/11 |
| 2014/0210253 A1* | 7/2014 | Okano | B60T 13/146 303/6.01 |
| 2014/0246897 A1* | 9/2014 | Miyata | B60T 13/141 303/10 |
| 2014/0373526 A1* | 12/2014 | Ohnishi | B60T 13/745 60/545 |

* cited by examiner

| | FIRST STATE | SECOND STATE | SWITCHING-TIME CHANGE SUPPRESSION CONTROL |
|---|---|---|---|
| COMMUNICATION CONTROL VALVE 152 | Open | Shut | DUTY CONTROL |
| RESERVOIR SHUTOFF VALVE 156 | Shut | Open | Shut |

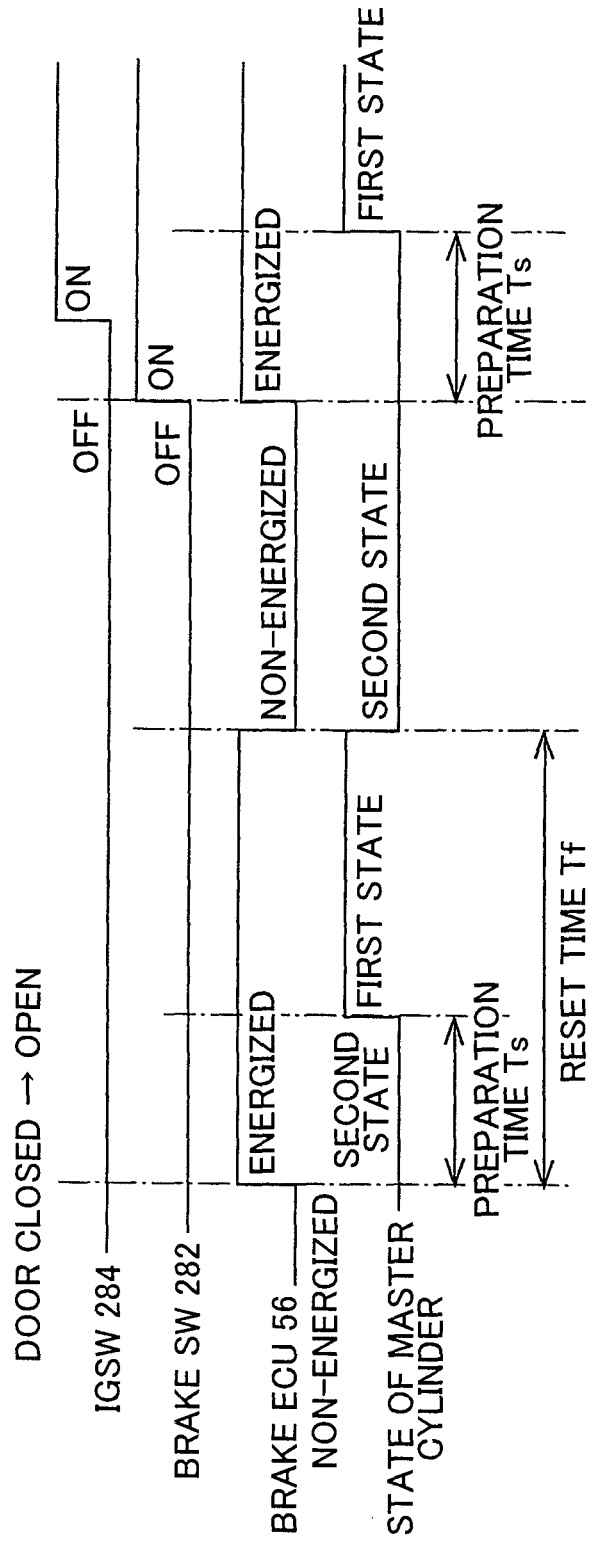

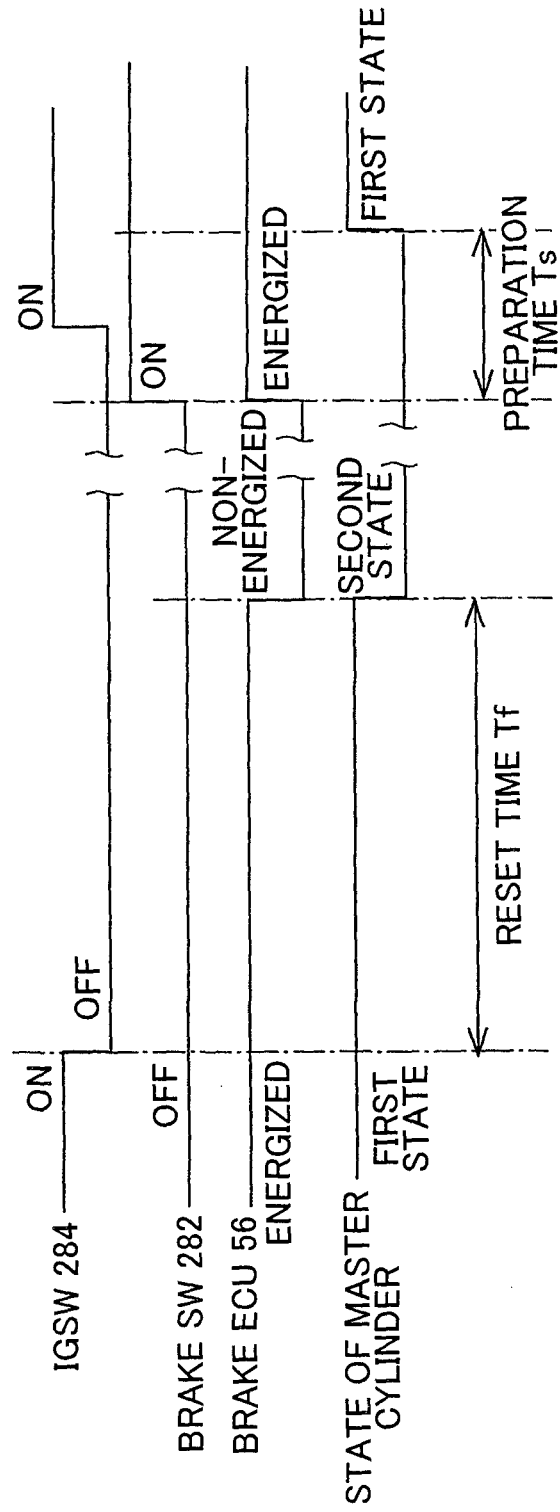

CYLINDER DEVICE AND HYDRAULIC BRAKE SYSTEM

BACKGROUND OF THE INVENTION

1. Field of the Invention

The invention relates to a cylinder device including a master cylinder provided in a vehicle, and a hydraulic brake system including the cylinder device.

2. Description of Related Art

A hydraulic brake system described in Japanese Patent Application Publication No. 2011-156998 (JP 2011-156998 A) includes a master cylinder, brake cylinders of hydraulic brakes that hydraulically curb or control rotation of vehicle wheels, a pressure-increasing mechanism capable of increasing the hydraulic pressure of a pressurizing chamber of the master cylinder, an accumulator, an electric hydraulic control device including a solenoid control valve capable of controlling the hydraulic pressure of the accumulator, and a hydraulic pressure supply switching device. When a control system of the system is in a normal condition, the hydraulic pressure supply switching device disconnects the brake cylinders from the pressure-increasing mechanism and the master cylinder, and supplies a hydraulic pressure of the electric hydraulic pressure control device as a controlled pressure to the brake cylinders. When the control system is in an abnormal condition, the hydraulic pressure supply switching device disconnects the brake cylinders from the accumulator, and supplies a hydraulic pressure of the pressure-increasing mechanism as a manual hydraulic pressure to the brake cylinders.

SUMMARY OF THE INVENTION

In view of the above-indicated publication, the invention provides an improved cylinder device including a master cylinder, and an improved hydraulic brake system including the cylinder device. For example, the invention provides a cylinder device and a hydraulic brake system, which are less likely to suffer from inconveniences that would arise when the master cylinder is switched between a first state and a second state.

The cylinder device according to the invention includes a master cylinder having a pressurizing piston, and an input piston linked with a brake operating member, and a master-cylinder state switching device is configured to switch the master cylinder between a first state in which the input piston is allowed to move relative to the pressurizing piston, and a second state in which the input piston is inhibited from moving relative to the pressurizing piston, and the master-cylinder state switching device includes a switching-time change suppression unit that suppresses change in the operating feeling of the brake operating member when the master cylinder is switched between the first state and the second state.

The "operating feeling" is determined by the relationship between the operating stroke of the brake operating member and operating force applied to the brake operating member. When the brake operating member is operated while the master cylinder is in the first state, the input piston is moved relative to the pressurizing piston. For example, in the case where a spring is provided between the input piston and the pressurizing piston (for example, where a stroke simulator is constituted by the input piston, pressurizing piston, spring, etc.), or the case where a stroke simulator is connected to a fluid chamber between the input piston and the pressurizing piston, the operating feeling of the brake operating member is determined by the stroke simulator (corresponding to the stroke simulator constituted by the input piston, pressurizing piston, spring, etc., or the stroke simulator connected to the fluid chamber between the input piston and the pressurizing chamber). When the brake operating member is operated while the master cylinder is in the second state, the input piston is moved, and the pressurizing piston is moved in accordance with the movement of the input piston. The operating feeling of the brake operating member is determined by a return spring, or the like, of the pressurizing piston.

Thus, the operating feeling of the brake operating member differs depending on whether the master cylinder is in the first state or the second state. Therefore, if the master cylinder is switched between the first state and the second state, the operating feeling changes, and the driver feels uncomfortable or has a feeling of strangeness. Also, when the master cylinder is switched between the first state and the second state, a pedal shock may occur such as when the brake operating member sinks down or reaction force rapidly changes. In the cylinder device according to the invention, on the other hand, change in the operating feeling during switching between the first state and the second state is suppressed or reduced, thus making it possible to alleviate the feeling of strangeness or discomfort of the driver, and reduce the pedal shock.

In the following, the present invention, or features of the invention, will be described.

According to one aspect of the invention, a cylinder device is provided which includes a master cylinder including a housing, a pressurizing piston that is fluid-tightly and slidably fitted in the housing and operable to generate a hydraulic pressure in a front pressurizing chamber, an input piston linked with a brake operating member and fluid-tightly and slidably fitted in the housing, to be located in the rear of the pressurizing piston, and an input chamber provided between the input piston and the pressurizing piston, and a master-cylinder state switching device that is configured to switch the master cylinder between a first state in which the input piston is allowed to move relative to the pressurizing piston, and a second state in which the input piston is inhibited from moving relative to the pressurizing piston. The master-cylinder state switching device includes a switching-time change suppression unit configured to suppress at least one of volumetric change and hydraulic pressure change of the input chamber during switching between the first state and the second state.

For example, the relationship between the operating force applied to the brake operating member and the operating stroke in each of the cases where the master cylinder is in the first state and where the master cylinder is in the second state may be determined so that the proportion of the operating stroke to the operating force is larger in the first state than that in the second state. In this case, when the master cylinder is switched from the second state to the first state, the operating stroke may be rapidly increased if the operating force is constant, or the reaction force may be rapidly reduced if the operating stroke is constant. If, on the other hand, at least one of change in the volume of the input chamber when the operating force is constant, and change in the hydraulic pressure of the input chamber when the operating stroke is constant, is suppressed or reduced when the master cylinder is switched from the second state to the first state, change of the operating feeling can be suppressed, in other words, the operating feeling is less likely to change. In this connection, "suppress" means reducing volumetric change or hydraulic pressure change, as compared with the case where control is not performed by the switching-time change suppression unit. Also, "suppress volumetric change" or "suppress hydraulic pressure change" means, for example, reducing the rate of change.

In the cylinder device as described above, the relationship between the operating force applied to the brake operating member and the operating stroke in the first state may be such that the proportion of the operating stroke to the operating force is larger than that in the second state.

In the cylinder device as described above, the pressurizing piston includes a front piston portion opposed to the front pressurizing chamber, and a middle piston portion provided in a middle portion thereof and having a larger diameter than a diameter of the front piston portion, and the master cylinder includes an annular chamber provided in front of the middle piston portion. The master-cylinder state switching device is configured to communicate the input chamber with the annular chamber in the first state, and shut off the input chamber from the annular chamber and communicate the annular chamber with a low-pressure source in the second state. The switching-time change suppression unit includes an input chamber communication control unit configured to control a condition of communication between the input chamber and the annular chamber when the master cylinder is switched from the second state to the first state.

While the annular chamber is in communication with the low-pressure source in the second state, the input chamber is in communication with the annular chamber in the first state. Therefore, when the master cylinder is switched from the second state to the first state, the volume of the input chamber may be reduced, or the hydraulic pressure of the input chamber may be reduced. On the other hand, if a condition of communication between the input chamber and the annular chamber is controlled when the master cylinder is switched from the second state to the first state, reduction of the volume of the input chamber may be suppressed, or reduction of the hydraulic pressure may be suppressed.

Here, in the cylinder device, the master-cylinder state switching device may communicate the annular chamber with the input chamber and shut off the annular chamber and the input chamber from the low-pressure source in the first state.

The master-cylinder state switching device may communicate the annular chamber with the input chamber, shut off the annular chamber and the input chamber from the low-pressure source, and communicate the annular chamber and the input chamber with the stroke simulator in the first state.

The cylinder device as described above may further include a connecting passage that connects the input chamber with the annular chamber, and is connected with the low-pressure source, and the master-cylinder state switching device may include a communication control valve that is provided in a portion of the connecting passage which is closer to the input chamber than a portion thereof to which the low-pressure source is connected, and is switchable at least between an open position and a closed position, and a low-pressure source shutoff valve that is provided between the connecting passage and the low-pressure source, and the low-pressure source shutoff valve is switchable at least between an open position and a closed position. The master-cylinder state switching device may be configured to place the low-pressure source shutoff valve in the closed position and place the communication control valve in the open position in the first state, and place the low-pressure source shutoff valve in the open position and place the communication control valve in the closed position in the second state. The input chamber communication control unit may include a solenoid valve control unit configured to control the communication control valve while the low-pressure source shutoff valve is in the closed position, so that the condition of communication between the input chamber and the annular chamber is gradually changed from a shut-off condition to a communicating condition.

With the communication control valve thus controlled, a condition of communication between the input chamber and the annular chamber is controlled. By gradually changing the condition of communication between the input chamber and the annular chamber from a shut-off condition to a communicating condition, change in the volume or hydraulic pressure of the input chamber can be further suppressed. The connecting passage may be included in the master cylinder.

The cylinder device may include a connecting passage that connects the input chamber with the annular chamber, and is connected with the low-pressure source. The master-cylinder state switching device may include a communication control valve that is provided in a portion of the connecting passage which is closer to the input chamber than a portion thereof to which the low-pressure source is connected, and is in the form of a solenoid-operated on-off valve that is opened and closed depending on whether current is supplied to a solenoid thereof, and a low-pressure source shutoff valve that is provided between the connecting passage and the low-pressure source, and the low-pressure source shutoff valve is switchable at least between an open position and a closed position. The master-cylinder state switching device may be configured to place the low-pressure source shutoff valve in the closed position and place the communication control valve in the open position in the first state, and place the low-pressure source shutoff valve in the open position and place the communication control valve in the closed position in the second state. The input chamber communication control unit may include a communication valve duty control unit that performs duty control on current supplied to the solenoid of the solenoid-operated on-off valve while the low-pressure source shutoff valve is in the closed position.

Here, in the cylinder device as described above, the communication valve duty control unit may include a duty-ratio determining unit configured to reduce a duty ratio as a ratio of an open time to a cycle time, the communication control valve being in the open position for the open time, as an operating stroke of the brake operating member at the time of switching from the second state to the first state is larger.

As the hydraulic pressure of the input chamber detected when a command to switch the master cylinder from the second state to the first state is issued is higher, a difference in the hydraulic pressure between the input chamber and the annular chamber is larger, and the rate of reduction in the hydraulic pressure of the input chamber when the communication control valve is switched from the closed position to the open position is larger. If the duty ratio is reduced as the hydraulic pressure of the input chamber detected when the command for switching from the second state to the first state is issued is higher, the rate of reduction in the hydraulic pressure of the input chamber can be reduced. In the case where a hydraulic pressure sensor, or the like, capable of detecting the hydraulic pressure of the input chamber in the second state is not provided, the hydraulic pressure of the input chamber cannot be directly detected at the time when the command for switching from the second state to the first state is issued. In the second state, however, the hydraulic pressure of the input chamber is presumed to be higher as the operating stroke is larger. Thus, as the operating stroke of the brake operating member detected when the command for switching from the second state to the first state is issued is larger, it is presumed that the hydraulic pressure of the input chamber is higher, and a difference in the hydraulic pressure between the input chamber and the annular chamber is larger, and the duty ratio is reduced. Consequently, change in the hydraulic pressure of the input chamber or change in the volume of the input chamber at the time of switching from the second state to the first state can be reduced.

There is another advantage that a difference in the rate of volumetric change of the input chamber or the rate of hydraulic pressure change of the input chamber can be reduced, between the case where the hydraulic pressure of the input chamber detected when a command for switching from the second state to the first state is issued is high, and the case where the hydraulic pressure is low. Where the communication control valve is a normally-closed type valve that is in the closed position when no current is supplied to its solenoid, the above-mentioned "open time for which the communication control valve is in the open position" means a length of time for which current is supplied to the solenoid. The "cycle time" means the sum of the ON time for which current is supplied to the solenoid in one cycle and the OFF time for which no current is supplied to the solenoid. It follows that the "duty ratio" is represented by the ratio {Ton/(Ton+Toff)} of the ON time to the cycle time (Ton+Toff). On the other hand, if the communication control valve is considered as being in the open position when current is supplied to the solenoid, and being in the closed position when no current is supplied to the solenoid, it may be considered that the duty ratio is the ratio {Topen/(Topen+Tshut)} of the open time to the cycle time.

Here, in the cylinder device, the communication valve duty control unit may include a duty-ratio varying unit that increases the duty ratio as an elapsed time from the time when control of the communication valve duty control unit is started is longer. The control of the communication valve duty control unit is started when a command to switch the master cylinder from the second state to the first state is generated. The duty ratio may be continuously increased, or may be increased in a stepwise fashion.

Here, the cylinder device may include a connecting passage that connects the input chamber with the annular chamber, and is connected with the low-pressure source, and the master-cylinder state switching device may include a communication control valve that is provided in a portion of the connecting passage which is closer to the input chamber than a portion thereof to which the low-pressure source is connected, and is in the form of a solenoid-operated linear valve whose opening can be continuously changed by continuously controlling the amount of current supplied to a solenoid thereof, and a low-pressure source shutoff valve that is provided between the connecting passage and the low-pressure source, and is switchable at least between an open position and a closed position. The master-cylinder state switching device may be configured to place the low-pressure source shutoff valve in the closed position and place the communication control valve in the open position in the first state, and place the low-pressure source shutoff valve in the open position and place the communication control valve in the closed position in the second state. The input chamber communication control unit may include a communication valve opening control unit that controls the opening of the communication control valve by controlling the amount of current supplied to the solenoid of the communication control valve while the low-pressure source shutoff valve is in the closed position.

In the cylinder device as described above, the communication valve opening control unit may include an opening determining unit that reduces the opening as the operating stroke of the brake operating member detected when the master cylinder is switched from the second state to the first state is larger. The opening of the communication control valve is reduced as a difference in the hydraulic pressure between the input chamber and the annular chamber when the master cylinder is switched from the second state to the first state is larger.

In the cylinder device as described above, the communication valve opening control unit may include an opening increasing unit that increases the opening as an elapsed time from the time when a command to switch the master cylinder from the second state to the first state is issued is longer. The opening may be continuously increased, or may be increased in a stepwise fashion.

In the cylinder device as described above, the switching-time change suppression unit may perform control for suppressing at least one of hydraulic pressure change and volumetric change of the input chamber, from the time when a command to switch the master cylinder from the second state to the first state is issued, until a predetermined finishing condition or conditions is/are satisfied.

For example, the finishing conditions may include at least one of a condition that a predetermined set time (which may be called "switching-time control duration") has elapsed, and a condition that the hydraulic pressure of the input chamber has reached a set pressure determined based on the operating stroke, etc. For example, where the communication control valve is a solenoid-operated on-off valve, the duty ratio may be increased according to a pattern, so that the duty ratio becomes equal to 1 when the switching-time control duration expires. Similarly, where the communication control valve is a linear valve, the opening of the valve may be increased according to a pattern, so that the opening becomes equal to the upper limit (for example, the valve is fully opened) when the set time expires.

The cylinder device as described above may further include a hydraulic pressure sensor provided in a portion of the connecting passage which is closer to the annular chamber than the communication control valve, and a communication control valve abnormality detecting unit configured to determine that the communication control valve is in an abnormal condition in a case where a detected value of the hydraulic pressure sensor is smaller than an abnormality determination threshold value when a determination time elapses from start of control performed by the switching-time change suppression unit.

For example, when the annular chamber and the low-pressure source are in communication with each other in the second state, the hydraulic pressure (e.g., the atmospheric pressure) of the low-pressure source is detected by the hydraulic pressure sensor. When the input chamber and the annular chamber are in communication with each other while being shut off from the low-pressure source in the first state, the hydraulic pressure of the input chamber is at the same level as that of the annular chamber, and the detected value of the hydraulic pressure sensor represents or corresponds to the hydraulic pressure of the input chamber and annular chamber. Therefore, if the master cylinder is switched from the second state to the first state, and the communication control valve is switched from the closed position to the open position, the detected value of the hydraulic pressure sensor should increase. On the other hand, if the detected value of the hydraulic sensor is smaller than the abnormality determination threshold value even after the determination time elapses from the start of the switching-time change suppression control, it may be considered that the communication control valve is kept in the closed position, namely, the communication control valve is abnormally stuck in the closed position. Namely, when the detected value of the hydraulic pressure sensor is equal to or larger than the abnormality determination threshold value after the determination time elapses from the start of the switching-time change suppression control, it may be determined that the master cylinder, master-cylinder state switching device, and others are in normal conditions. For example, it may be determined that there is no fluid leakage in the connecting passage, input chamber, annular chamber, etc., and the communication control valve and the low-pressure source shutoff valve are in normal conditions, while the hydraulic pressure sensor is in a normal condition.

If the detected value of the hydraulic pressure sensor is smaller than the abnormality determination threshold value after the determination time elapses, a part of the master cylinder, master-cylinder state switching device, etc. may be in an abnormal condition. For example, there may be a fluid leakage in any of the connecting passage, input chamber, annular chamber, etc., or the communication control valve may be abnormally stuck in the closed position, or the low-pressure source shutoff valve may be abnormally stuck in the open position, or the hydraulic pressure sensor may be in an abnormal condition. However, if it is found in advance that there is no fluid leakage in the connecting passage, input chamber, annular chamber, etc., the low-pressure source shutoff valve is in a normal condition, and that the hydraulic pressure sensor is in a normal condition, or if an abnormality is more likely to occur to the communication control valve than abnormalities in other components or portions, it may be determined that the communication control valve is in an abnormal condition in which the valve is stuck in the closed position.

The abnormality determination threshold value and the determination time may be fixed values or variable values. For example, the abnormality determination threshold value and the determination value may be determined based on the content of control (the duty ratio, the manner of changing the duty ratio, the opening, the manner of changing the opening) performed by the switching-time change suppression unit, or may be determined based on the operating stroke detected when the control of the switching-time change suppression unit is started (for example, determined based on the hydraulic pressure of the input chamber). For example, the determination time may be set to be shorter, and the abnormality determination threshold value may be set to be larger, as the operating stroke is larger, and the hydraulic pressure of the input chamber is higher. The hydraulic pressure sensor may be provided in the connecting passage or in the annular chamber. It may be determined that the communication control valve is abnormally stuck in the closed position when the rate of increase in the detected value of the hydraulic pressure sensor after control of the switching-time change suppression unit is started is equal to or smaller than an abnormality determination rate of increase.

In the cylinder device as described above, the master-cylinder state switching device may include a switching unit configured to switch the master cylinder to the second state when an abnormality of the communication control valve is detected by the communication control valve abnormality detecting unit.

The detection of an abnormality in the communication control valve may be conducted during the switching-time change suppression control or after the master cylinder is switched to the first state. However, if the detection is conducted during the switching-time change suppression control, change in the operating feeling at the time of switching back to the second state when an abnormality of the communication control valve is detected can be reduced, as compared with the case where the detection is conducted after the master cylinder is switched to the first state. When the detection is conducted during the switching-time change suppression control, the determination time is set to be shorter than the switching-time control duration. When an abnormality of the communication control valve stuck in the closed position is detected, the switching-time change suppression control is discontinued, and the master cylinder is switched to the second state. Thereafter, no command for switching from the second state to the first state is supposed to be issued.

Also, the cylinder device may include a stroke simulator connected to a portion of the connecting passage which is closer to the annular chamber than a portion of the connecting passage to which the low-pressure source is connected. When the master cylinder is in the first state, both of the input chamber and the annular chamber are shut off from the low-pressure source, and communicate with the stroke simulator.

In the cylinder device as described above, the pressurizing piston may include a rear opposed portion that is opposed to the input chamber, and the area of an opposed face of the middle piston portion which is opposed to the annular chamber may be made substantially equal to the area of an opposed face of the rear opposed portion which is opposed to the input chamber.

In the first state, the annular chamber and the input chamber are in communication with each other, and therefore, the hydraulic pressure of the annular chamber is substantially equal to that of the input chamber. Accordingly, the force applied to the pressurizing piston in the advancing direction due to the hydraulic pressure of the input chamber is balanced with the force applied to the pressurizing piston in the retracting direction due to the hydraulic pressure of the annular chamber; therefore, the pressurizing piston is not advanced due to the operating force applied to the brake operating member.

The cylinder device as described above may include a stroke simulator connected to the input chamber, and a simulator shutoff valve that is provided between the input chamber and the stroke simulator and is switchable at least between an open position and a closed position. The master-cylinder state switching device may place the simulator shutoff valve in the open position in the first state, and place the simulator shutoff valve in the closed position in the second state. The switching-time change suppression unit may include a simulator shutoff valve control unit that controls the simulator shutoff valve when the master cylinder is switched from the second state to the first state so as to control a condition of communication between the input chamber and the stroke simulator.

The simulator shutoff valve may be an on-off valve that is opened and closed depending on whether current is supplied to its solenoid, or may be a linear valve whose opening is continuously changed through continuous control of the magnitude of the current supplied to the solenoid. The simulator shutoff valve may be regarded as corresponding to the communication control valve.

Here, the pressurizing piston may include a front piston portion opposed to the front pressurizing chamber, and a middle piston portion provided in a middle portion thereof and having a larger diameter than a diameter of the front piston portion, and the master cylinder may include an annular chamber provided in front of the middle piston portion, while the cylinder device may include a release valve provided between the annular chamber and the low-pressure source. In operation, the master-cylinder state switching device may place the release valve in a closed position in the first state, and place the release valve in an open position in the second state. The release valve is placed in the closed position during switching-time change suppression control performed when the master cylinder is switched from the second state to the first state. The release valve may be regarded as corresponding to the reservoir shutoff valve.

In the cylinder device as described above, the master-cylinder state switching device may include a switching command generating unit configured to generate a command to switch the master cylinder from the second state to the first state, in at least one of the case where the brake operating member is operated, and the case where a hydraulic pressure is required to be developed in the front pressurizing chamber.

The master-cylinder state switching device generates a command to switch the master cylinder from the second state to the first state when a request for curbing rotation of the wheels, namely, a request for braking force, is detected. The request for braking force is not limited to a request for hydraulic braking force, but includes a request for regenerative braking force. The master-cylinder state switching device may include, for example, a brake ECU, and a plurality of solenoid-operated valves (such as a communication control valve and a low-pressure source shutoff valve). When a request for braking force is detected, current is applied to the brake ECU in response to the request, as a trigger, preparation for execution of programs by the ECU is made, and a switching command is generated after the preparation is completed. Then, the solenoid-operated valves are switched in response to the switching command, so that the master cylinder is switched from the second state to the first state.

According to another aspect of the invention, a cylinder device is provided which includes a master cylinder including a housing, a pressurizing piston that is fluid-tightly and slidably fitted in the housing and operable to generate a hydraulic pressure in a front pressurizing chamber, an input piston linked with a brake operating member and fluid-tightly and slidably fitted in the housing, to be located in the rear of the pressurizing piston, and an input chamber provided between the input piston and the pressurizing piston, and a master-cylinder state switching device that is configured to switch the master cylinder between a first state in which the input chamber is allowed to move relative to the pressurizing piston, and a second state in which the input chamber is inhibited from moving relative to the pressurizing piston. The master-cylinder state switching device includes a switching-time change suppression unit that suppresses change in the relationship between the operating force and operating stroke of the brake operating member during switching between the first state and the second state.

For example, in the case where the proportion of the operating stroke to the operating force is larger when the master cylinder is in the first state, as compared with the case where the master cylinder is in the second state, the operating feeling may turn to be harder or stiffer when the master cylinder is switched from the first state to the second state, and may turn to be softer when the master cylinder is switched from the second state to the first state. On the other hand, in the cylinder device as described above, change in the operating, feeling is suppressed in at least one of the case where the master cylinder is switched from the first state to the second state, and the case where the master cylinder is switched from the second state to the first state.

Here, the cylinder device may include a master cylinder including a housing, a pressurizing piston fluid-tightly and slidably fitted in the housing and having a front piston portion provided in a front portion thereof, and a middle piston portion provided in a middle portion thereof and having a larger diameter than a diameter of the front piston portion, the pressurizing piston being operable to generate a hydraulic pressure in a front pressurizing chamber as a pressurizing chamber located in front of the front piston portion, an input piston that is linked with a brake operating member, and fluid-tightly and slidably fitted in the housing, to be located in the rear of the pressurizing piston, an input chamber provided between the input piston and the pressurizing piston, and an annular chamber provided in front of the middle piston portion, and a master-cylinder state switching device that switches the master cylinder between a first state in which the input chamber communicates with the annular chamber, and a second state in which the input chamber is shut off from the annular chamber, and the annular chamber communicates with a low-pressure source. The master-cylinder state switching device may include a switching-time change suppression unit that suppresses at least one of a hydraulic pressure change of the input chamber and a volumetric change of the input chamber during switching from the second state to the first state.

According to a further aspect of the invention, a hydraulic brake system is provided which includes the cylinder device as described above, a brake cylinder hydraulic pressure control device configured to control a hydraulic pressure of the front pressurizing chamber so as to control a hydraulic pressure of each of brake cylinders of hydraulic brakes connected to the front pressurizing chamber and operable to curb rotation of wheels of the vehicle. In the hydraulic brake system, the pressurizing piston includes a front piston portion opposed to the front pressurizing chamber, a middle piston portion provided in a middle portion thereof and having a larger diameter than a diameter of the front piston portion, and a rear small-diameter portion provided at the rear of the middle piston portion and having a smaller diameter than a diameter of the middle piston portion, and the master cylinder includes a back chamber provided at the rear of the middle piston portion. The brake cylinder hydraulic pressure control device includes a back pressure control device configured to control the hydraulic pressure of the front pressurizing chamber by controlling a hydraulic pressure of the back chamber, thereby to control the hydraulic pressure of the brake cylinders.

The front piston portion, middle piston portion, and rear small-diameter portion of the pressurizing, piston are respectively fluid-tightly and slidably fitted in the housing. The back chamber is formed at the rear of the middle piston portion, and force is applied to the pressurizing piston in the advancing direction, due to the hydraulic pressure of the back chamber. The rear small-diameter portion may be considered as corresponding to the above-mentioned rear opposed portion. When the pressurizing piston is advanced under the hydraulic pressure of the back chamber, the hydraulic pressure of the front pressurizing chamber is increased to a level commensurate with the hydraulic pressure of the back chamber. Since the hydraulic pressure of the front pressurizing chamber is supplied to the brake cylinders, the hydraulic pressure of the brake cylinders is controlled through control of the hydraulic pressure of the back chamber.

In the hydraulic brake system as described above, the brake cylinder hydraulic pressure control device may control the hydraulic pressure of the back chamber, when hydraulic braking force is requested, in at least one of the case where the master cylinder is in the first state, and the case where control is performed by the switching-time change suppression unit.

In the hydraulic brake system as described above, the master cylinder may include an annular chamber provided in front of the middle piston portion, and the cylinder device may include a connecting passage that connects the input chamber with the annular chamber. In the first state, the master-cylinder state switching device communicates the input chamber with the annular chamber, and communicates these chambers with a stroke simulator, while shutting off these chambers from a low-pressure source. In the second state, the master-cylinder state switching device shuts off the input chamber from the annular chamber, the low-pressure source and the stroke simulator, and communicates the annular chamber with the low-pressure source. The back pressure control device may include a different-mode control unit that controls the hydraulic pressure of the back chamber in different modes, between the case where the master cylinder is switched from the second state to the first state in a condition where the brake operating member is being operated, and the case where the master cylinder is in the first state from the time when the brake operating member starts being operated.

The "condition where the brake operating member is being operated" is a condition in which the brake operating member is regarded as being operated, or a condition in which the operating stroke is larger than a set stroke. The set stroke may be equal to or larger than a threshold value of operating stroke at which the brake switch changes from a state (e.g., OFF) corresponding to a non-operated condition of the brake operating member, to a state (e.g., ON) corresponding to an operated condition of the brake operating member. In other words, the non-operated condition of the brake operating member refers to a condition in which the brake switch is OFF, and is not limited to a condition where the operating stroke is 0 (zero). The "case where the master cylinder is in the first state from the time when the brake operating member starts being operated" corresponds to the case where the master cylinder is in the first state when the brake switch is OFF, and the brake operating member starts being operated when the master cylinder is in the first state, or the case where the master cylinder is switched to the first state when the brake switch is switched from OFF to ON. If the master cylinder is switched from the second state to the first state when the operating stroke is equal to or smaller than the threshold value, any inconvenience or problem caused by this situation seems unlikely to occur.

In the hydraulic brake system as described above, the back pressure control device may include a stroke sensor that detects a stroke of the brake operating member, a hydraulic pressure sensor that detects a hydraulic pressure of the annular chamber, and a target hydraulic pressure determining unit that is configure to determine a target hydraulic pressure of the back chamber based on at least one of a detected value of the hydraulic pressure sensor and a detected value of the stroke sensor. The target hydraulic pressure determining unit may include a different-mode determining unit configured to determine the target hydraulic pressure of the back chamber in different modes, between the case where the master cylinder is switched from the second state to the first state while the brake operating member is being operated, and the case where the master cylinder is in the first state from the time when the brake operating member starts being operated.

When the master cylinder is in the first state from the time when the brake operating member starts being operated, the relationship between the operating stroke and the operating force is determined by characteristics of the stroke simulator, for example, and is constant. In this case, both the operating stroke and the operating force accurately represent the intention of the driver. On the other hand, when the master cylinder is switched from the second state to the first state while the brake operating member is being operated, the stroke simulator starts being operated from the time when the master cylinder is switched to the first state. Namely, the stroke simulator is started from a condition where the operating stroke of the brake operating member is large, and the relationship between the operating stroke (the amount of increase of the operating stroke) and the operating force is determined by characteristics of the stroke simulator, from the operating stroke at the time of switching. Therefore, the operating force may be small relative to the operating stroke, as compared with the case where the stroke simulator is operated from the beginning of operation of the brake operating member. In particular, when the master cylinder is switched from the second state to the first state in a condition where the operating stroke is in the vicinity of the full stroke, the operating stroke, rather than the operating force, is considered to accurately represent the intention of the driver. Thus, the relationship between the operating stroke and the operating force differs, between the case where the master cylinder is switched from the second state to the first state while the brake operating member is being operated, and the case where the master cylinder is in the first state at the time when the brake operating member starts being operated. Thus, it is appropriate to determine the target hydraulic pressure in different modes, in the respective cases.

When the target hydraulic, pressure is determined based on both of the operating stroke and the operating force, the weight of one of the operating stroke and the operating force having a higher reliability (one that represents the intention of the driver with higher accuracy) may be made larger than that of the other. The weight of one of the operating stroke and the operating force may be increased by taking no account of the other (setting the weight to 1). If the reaction force is reduced when the master cylinder is switched from the second state to the first state, the driver may increase the operating stroke so as to continuously increase the reaction force. In this case, the operating force, rather than the operating stroke, is considered to represent the intention of the driver with higher accuracy. Since one of the operating stroke and the operating force having the higher reliability can be determined based on change in the rate of change of the detected value of the stroke sensor, and the detected value of the hydraulic pressure sensor, for example, the target hydraulic pressure may be determined by increasing the weight of the one having the higher reliability.

In the hydraulic brake system as described above, the back pressure control device may include a housing, a control piston fluid-tightly and slidably fitted in the housing, a control chamber provided at the rear of the control piston, a control pressure output chamber provided in front of the control piston and connected to the back chamber, a regulator including a low-pressure source communication path through which the control pressure output chamber communicates with a low-pressure source when the control piston is at a retracted end position, and a regulator hydraulic pressure control unit that controls the hydraulic pressure of the control pressure output chamber by controlling the hydraulic pressure of the control chamber, so as to control the hydraulic pressure of the back chamber.

The regulator is connected to the back chamber, and the hydraulic pressure of the back chamber is controlled through control of the regulator. When the regulator is in a non-operated condition, namely, when the control piston is placed at the retracted end position, the control-pressure output chamber is communicated with the low-pressure source, and therefore, no hydraulic pressure is supplied to the back chamber. On the other hand, if a hydraulic pressure is supplied to the control chamber, the control piston is advanced. As a result, the control-pressure output chamber is disconnected from the low-pressure source, and a hydraulic pressure is developed in the control-pressure output chamber, and supplied to the back chamber.

In the hydraulic brake system as described above, the regulator may include a pilot piston fluid-tightly and slidably fitted in the housing, in the rear of the control piston, and a pilot pressure chamber provided in the rear of the pilot piston and connected with at least one of the front pressurizing chamber and the input chamber of the master cylinder. In the second state, the pilot piston is advanced under the hydraulic pressure of the pilot pressure chamber, and the control piston is advanced so that a hydraulic pressure is generated in the control-pressure output chamber.

In the second state, a hydraulic, pressure whose magnitude is determined by the operated condition of the brake operating member is supplied to the pilot pressure chamber. As a result, the pilot piston is advanced, and the control piston is advanced, so that a hydraulic pressure is generated in the control-pressure output chamber. As a result, the hydraulic pressure is supplied to the back chamber, and the hydraulic pressure of the front pressurizing chamber is increased. The regulator functions as a hydraulic booster.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10B is a view useful for explaining the case where the master cylinder is switched between the second state and the first state (where switching-time change suppression control is not performed), in the hydraulic brake system, more specifically, the case where the ignition switched is not turned on before the reset time elapses from the time when the door is opened; and FIG. 10C is a view useful for explaining the case where the master cylinder is switched between the second state and the first state (where switching time change suppression control is not performed) in the hydraulic brake system, more specifically, the case where the ignition switch is turned off, and then turned on again.

DETAILED DESCRIPTION OF EMBODIMENTS

A hydraulic brake system according to one embodiment of the invention will be described in detail with reference to the drawings.

Figure 1:
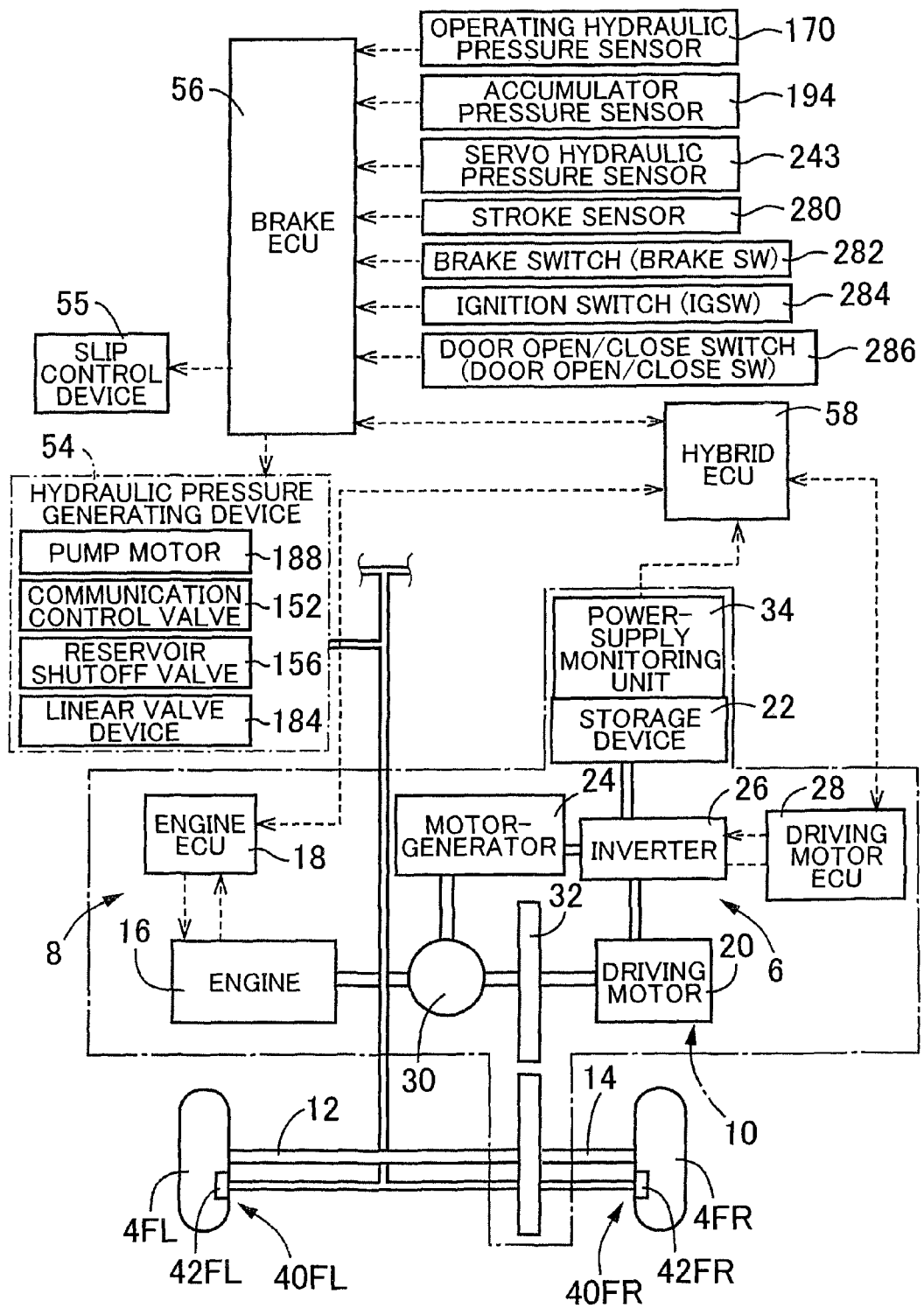
FIG. 1 is a view showing the whole of a vehicle on which a hydraulic brake system according to one embodiment of the invention is installed, wherein the hydraulic brake system includes a cylinder device according to one embodiment of the invention.

As shown in FIG. 1, the hydraulic brake system of this embodiment is installed on a hybrid vehicle (such as a plug-in hybrid vehicle), for example. In the hybrid vehicle, right and left front wheels 4FR, 4FL as driving wheels are driven by a drive unit 10 including an electric drive unit 6 and an internal combustion drive unit 8. The driving force of the drive unit 10 is transmitted to the right and left front wheels 4FR, 4FL via drive shafts 12, 14. The internal combustion drive unit 8 includes an engine 16, an engine ECU 18 that controls operating conditions of the engine 16, and so forth, and the electric drive unit 6 includes a motor for driving the wheels (which may be simply called "electric motor") 20, an electric storage device 22, a motor-generator 24, an inverter 26, a driving motor ECU (which may be simply called "motor ECU") 28, and so forth. The engine 16, electric motor 20, and the motor-generator 24 are coupled to a power split device 30, and the drive unit 10 is operable in a selected one of an operating mode in which only the driving force of the electric motor 20 is transmitted to an output member 32, an operating mode in which the driving force of the engine 16 and the driving force of the electric motor 20 are both transmitted to the output member 32, and an operating mode in which the output of the engine 16 is generated to the motor-generator 24 and the output member 32, for example. The output member 32 is a constituent element of a speed reducer, and the driving force of the drive unit 10 is transmitted to the drive shafts 12, 14 via the speed reducer and a differential gear unit. The inverter 26 is controlled by the motor ECU 28. With the inverter 26 thus controlled, the electric drive unit 6 is switched at least between a driving mode in which electric energy is supplied from the electric storage device 22 to the electric motor 20 so as to rotate the motor 20, and a charging mode in which the electric motor 20 functions as a generator that generates electric power through regenerative braking, so that the storage device 22 is charged with electric energy. In the charging mode, regenerative braking force is applied to the right and left front wheels 4FR, 4FL. In this sense, the electric drive unit 6 may also be called "regenerative brake device". The electric storage device 22 may include a nickel-metal-hydride battery, or a lithium-ion battery, for example. A power-supply monitoring unit 34 obtains information representing the state of charge of the storage device 22.

Figure 2:
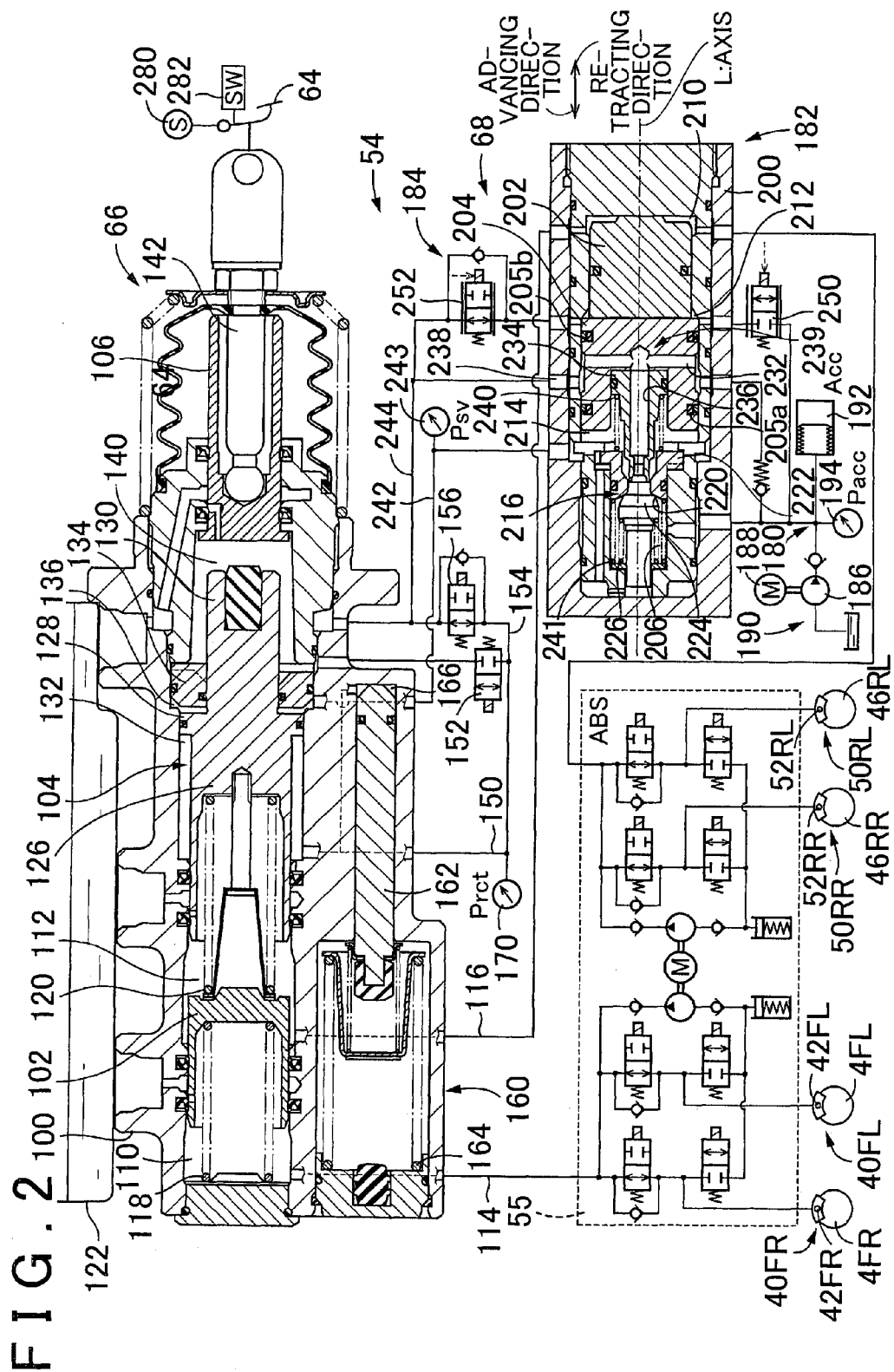
FIG. 2 is a hydraulic circuit diagram of the hydraulic brake system.

As shown in FIG. 2, the hydraulic brake system includes brake cylinders 42FR, 42FL of hydraulic brakes 40FR, 40FL provided for the right and left front wheels 4FR, 4FL, and brake cylinders 52RR, 52RL of hydraulic brakes 50RR, 50RL provided for the right and left rear wheels 46RR, 46RL, a hydraulic pressure generating device 54 capable of supplying hydraulic pressures to the brake cylinders 42FR, 42FL, 52RR, 52RL, a slip control device 55 provided between the brake cylinders 42FR, 42FL, 52RR, 52RL and the hydraulic pressure generating device 54, and so forth. The hydraulic pressure generating device 54, etc. is controlled by a brake ECU 56 that mainly consists of a computer. The vehicle is also provided with a hybrid ECU 58. The hybrid ECU 58, brake ECU 56, engine ECU 18, motor ECU 28, and the power-supply monitoring unit 34 can communicate with each other, and necessary information is transmitted and received as needed among these ECUs.

The hydraulic brake system of the invention is not limitedly installed on the vehicle as described above, but may also be installed on an electric vehicle, or a fuel cell vehicle. In the electric vehicle, the internal combustion drive unit 8 is not provided. In the fuel cell vehicle, the driving motor is driven by a stack of fuel cells, for example. The hydraulic brake system may also be installed on a vehicle driven by an internal combustion driving source. In this type of vehicle, the electric drive unit 6 is not provided. Therefore, no regenerative braking force is applied to the driving wheels 4FR, 4FL, and regeneration coordination control is not performed.

In the following, the construction of the hydraulic brake system will be described. As shown in FIG. 2, in the hydraulic brake system, the hydraulic pressure generating device 54 includes a brake pedal 64 as a brake operating member, a master cylinder 66, a back pressure control device 68 that controls the hydraulic pressure of a back chamber of the master cylinder 66, and so forth. The master cylinder 66 includes a housing 100, pressurizing pistons 102, 104 and input piston 106 that are arranged in series and fluid-tightly and slidably fitted in a cylinder bore formed in the housing 100, and so forth. Front pressurizing chambers 110, 112 are formed in front of the pressurizing pistons 102, 104, respectively. The brake cylinders 42FR, 42FL of the hydraulic brakes 40FR, 40FL of the right and left front wheels 4FR, 4FL are connected to the front pressurizing chamber 110, via a fluid passage 114, and the brake cylinders 52RR, 52RL of the hydraulic brakes 50RR, 50RL of the right and left rear wheels 46RR, 46RL are connected to the front pressurizing chamber 112, via a fluid passage 116. The hydraulic brakes 40FR, 40FL, 50RR, 50RL are operated by the hydraulic pressures of the brake cylinders 42FR, 42FL, 52RR, 52RL, respectively, so as to curb rotation of the wheels 4FR, 4FL, 46RR, 46RL. Also, return springs 118, 120 are disposed between the pressurizing piston 102 and the housing 100, and between the two pressurizing pistons 102, 104, respectively, for biasing the pressurizing pistons 102, 104 in retracting directions. When the pressurizing pistons 102, 104 are placed at their retracting end positions, the front pressurizing chambers 110, 112 are in communication with a reservoir 122.

The pressurizing piston 104 includes a front piston portion 126 provided in a front part thereof, a middle piston portion 128 that is provided in a middle part thereof and protrudes in radial directions, and a rear small-diameter portion 130 that is provided in a rear part thereof and has a smaller diameter than a diameter of the middle piston portion 128. The front piston portion 126 and the middle piston portion 128 are fluid-tightly and slidably fitted in the housing 100, and the front pressurizing chamber 112 is formed in front of the front piston portion 126, while an annular chamber 132 is formed in front of the middle piston portion 128. On the other hand, an annular, radially inwardly protruding portion 134 is provided on the housing 100, and the rear small-diameter portion 130 located at the rear of the middle piston portion 128 is fluid-tightly and slidably fitted in the protruding portion 134. As a result, the above-mentioned back chamber 136 is formed between the middle piston portion 128 and the radially inwardly protruding portion 134, to be located at the rear of the middle piston portion 128. The input piston 106 is located in the rear of the pressurizing piston 104, and an input chamber 140 is formed between the rear small-diameter portion 130 and the input piston 106. The brake pedal 64 is linked with a rear portion of the input piston 106, via an operating rod 142, etc.

The annular chamber 132 and the input chamber 140 are connected to each other by a connecting passage 150, and a communication control valve 152 is provided in the connecting passage 150. The communication control valve 152 is a solenoid-operated on-off valve that is opened and closed depending on whether electric current is supplied to a solenoid coil (which may be simply called "solenoid") of the valve 152. The communication control valve 152 is a normally-closed type valve that is normally in the closed position when no current is supplied to the solenoid. A portion of the connecting passage 150 which is closer to the annular chamber 132 than the communication control valve 152 is connected to the reservoir 122 via a reservoir passage 154, and a reservoir shutoff valve 156 is provided in the reservoir passage 154. The reservoir shutoff valve 156 is a solenoid-operated on-off valve that is opened and closed depending on whether electric current is supplied to its solenoid, and is a normally-open type valve that is normally in the open position when no current is supplied to the solenoid. A stroke simulator 160 is connected to a portion of the connecting passage 150 which is closer to the annular chamber 132 than its portion connected with the reservoir passage 154. The stroke simulator 160 includes a simulator piston 162 fluid-tightly and slidably fitted in a housing, a spring 164 provided between the simulator piston 162 and the housing, and a simulator chamber 166 that is provided on one side of the simulator piston 162 opposite to the side on which the spring 164 is provided, and communicates with the connecting passage 150. The annular chamber 132 and the input chamber 140 are connected to the simulator chamber 166, via the connecting passage 150. Further, a hydraulic pressure sensor 170 is provided in a portion of the connecting passage 150 which is closer to the annular chamber 132 than its portion to which the reservoir passage 154 is connected. The hydraulic pressure sensor 170 detects the hydraulic pressure of the annular chamber 132 and the input chamber 140, in a condition where the annular chamber 132 and the input chamber 140 communicate with each other and are shut off from the reservoir 122. The hydraulic pressure detected by the hydraulic pressure sensor 170 is commensurate with or corresponds to the operating force applied to the brake pedal 64; therefore, the hydraulic pressure sensor 170 may also be called "operating force sensor", or "operating hydraulic pressure sensor". The hydraulic pressure of the annular chamber 132 and the input chamber 140 also functions as reaction force; therefore, the hydraulic pressure sensor 170 may also be called "reaction force sensor".

Next, the back pressure control device will be described. The back pressure control device 68 is connected to the back chamber 136. The back pressure control device 68 includes a high-pressure source 180, a regulator 182, a linear valve device 184, and so forth. The high-pressure source 180 includes a pump device 190 having a pump 186 and a pump motor 188, and an accumulator 192 in which a working fluid discharged from the pump 186 is stored in a pressurized condition. The accumulator pressure as the hydraulic pressure of the working fluid stored in the accumulator 192 is detected by an accumulator pressure sensor 194. The pump motor 188 is controlled so that the accumulator pressure is held at a level within a predetermined set range. The regulator 182 includes a housing 200, and a pilot piston 202 and a control piston 204 which are provided in the housing 200 and arranged in series in a direction parallel to the axis L. The housing 200 is formed with a stepped cylinder bore having a large-diameter portion and a small-diameter portion. The pilot piston 202 is fluid-tightly and slidably fitted in the large-diameter portion, and the control piston 204 is fluid-tightly and slidably fitted in the large-diameter portion via seal members 205a, 205b, while a high-pressure chamber 206 connected to the high-pressure source 180 is formed in the small-diameter portion. A pilot pressure chamber 210 is formed between the pilot piston 202 and the housing 200, and a control chamber 212 is formed between the pilot piston 202 and the control piston 204, while a servo pressure chamber 214 as a control pressure output chamber is formed between the control piston 204 and a stepped portion between the large-diameter portion and small-diameter portion of the cylinder bore. Also, a high-pressure supply valve 216 is provided between the servo pressure chamber 214 and the high-pressure chamber 206. The housing 200 is provided with a valve-seat member 222 having a valve seat 220, and the high-pressure supply valve 216 includes the valve seat 220, a valve spool 224 arranged to be seated on or spaced from the valve seat 220, a spring 226 provided between the valve spool 224 and the housing 200, for biasing the valve spool 224 in a direction (retracting direction) in which the valve spool 224 is seated on the valve seat 220, and so forth. In the meantime, a receiving hole that extends in a direction parallel to the axis L is formed in a central portion of the main body of the control piston 204, and a fluid passage 232 is formed which communicates with the receiving hole and has a portion that, extends in a direction perpendicular to the axis L, or radial directions. The fluid passage 232 is provided at a position at which it communicates with a low-pressure port 238 provided in the housing 200. A valve opening member 234 that extends in parallel with the axis L is received in the receiving hole. A through-hole 236 is formed in parallel with the axis L, in a central portion of the valve opening member 234, and a rear end portion of the valve opening member 234 is open to the fluid passage 232, while a front end portion thereof is opposed to the valve spool 224. With this arrangement, the end portion of the valve opening member 234 which is opposed to the valve spool 224 and the low-pressure port 238 are connected to each other via the through-hole 236 and the fluid passage 232, and the through-hole 236 and the fluid passage 232 provide a low-pressure port communication channel 239. A spring 240 is provided between the valve opening member 234 and the valve seat member 222, for biasing the control piston 204 (having the valve opening member 234) in a retracting direction. Thus, the control piston 204 has a generally stepped shape, and the control chamber 212 is formed at the rear of a large-diameter portion of the control piston 204, while the servo pressure chamber 214 is formed in front of the stepped portion between the large-diameter portion and the small-diameter portion. Thus, the control piston 204 functions as a pressure increasing piston, and is operable to increase the hydraulic pressure of the servo pressure chamber 214 relative to the hydraulic pressure of the control chamber 212.

A spring 241 is provided between the valve-seat member 222 and the housing 200, for specifying the position of the valve-seat member 222 relative to the housing 200. Also, the fluid passage 116 is connected to the pilot pressure chamber 210. Therefore, the hydraulic pressure of the pressurizing chamber 112 of the master cylinder 66 is applied to the pilot piston 202. Further, the back chamber 136 of the master cylinder 66 is connected to the servo pressure chamber 214 via a servo passage 242. A servo hydraulic pressure Psb as the hydraulic pressure of the servo pressure chamber 214 is supplied to the back chamber 136, so as to operate the master cylinder 66. The servo passage 242 is provided with a servo hydraulic pressure sensor 243, which detects the servo hydraulic pressure. As shown in FIG. 2, the servo pressure chamber 214 is directly connected with the back pressure 136; therefore, the hydraulic pressure of the servo pressure chamber 214 is, as a principle, at the same level as the hydraulic pressure of the back chamber 136. The reservoir 122 is connected to the low-pressure port 238 via a reservoir passage 244.

The linear valve device 184 including a pressure-increasing linear control valve 250 and a pressure-reducing linear control valve 252 is connected to the control chamber 212, and the hydraulic pressure of the control chamber 212 is controlled through control of the pressure-increasing linear control valve 250 and the pressure-reducing linear control valve 252. The pressure-increasing linear control valve 250 is provided between the control chamber 212 and the high-pressure source 180, and the pressure-reducing linear control valve 252 is provided between the control chamber 212 and the reservoir 122. The pressure-increasing linear control valve 250, which is a normally-closed type valve that is in the closed position when no current is supplied to its solenoid, controls the hydraulic pressure of the control chamber 212 to a level commensurate with or corresponding to the amount of current supplied to the solenoid. The pressure-reducing linear control valve 252, which is a normally-open type valve that is in the open position when no current is supplied to its solenoid, controls the hydraulic pressure of the control chamber 212 to a level commensurate with or corresponding to the amount of current supplied to the solenoid.

The above-mentioned operating hydraulic pressure sensor 170, accumulator pressure sensor 194, and servo hydraulic pressure sensor 243 are connected to the brake ECU 56. A stroke sensor 280 that detects the stroke (which may also be called "operating stroke") of the brake pedal 64, a brake switch 282 that takes different positions depending on whether or not the brake pedal 64 is being depressed, an ignition switch 284, a door open/close switch 286 that takes different positions depending on whether the door on the side of the driver's seat (not shown) is open or closed, etc. are also connected to the brake ECU 56. Also, the slip control device 55, communication control valve 152, reservoir shutoff valve 156, linear valve device 184, pump motor 188, etc. are connected to the brake ECU 56. Various tables, programs, and the like, are stored in a storage portion of the brake ECU 56. In this embodiment, the brake switch 282 is placed in the OFF position when the operating stroke of the brake pedal 64 is smaller than a set stroke, and is placed in the ON position when the operating stroke is equal to or larger than the set stroke. The ignition switch 284 is allowed to be switched from OFF to ON when the brake switch 282 is ON. The door open/close switch 286 is placed in the OFF position when the door is in a closed state, and is placed in the ON position when the door is in an open state.

Figure 3:
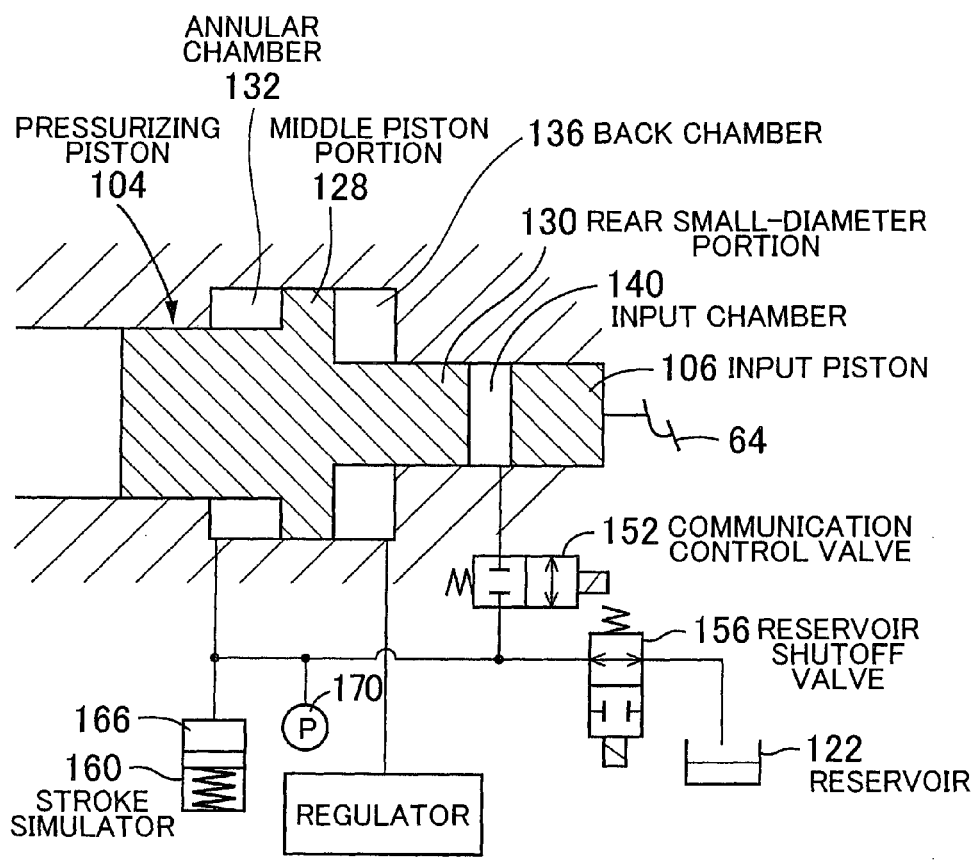
FIG. 3 is a view schematically showing a principal part of the hydraulic brake system.

Next, the operation of the hydraulic brake system will be described. The master cylinder 66 is switched between a first state and a second state, depending upon whether the communication control valve 152 and the reservoir shutoff valve 156 is open or closed. As shown in FIG. 3, the master cylinder 66 is in the first state when the communication control valve 152 is in the open position, and the reservoir shutoff valve 156 is in the closed position, and the master cylinder 66 is in the second state when the communication control valve 152 is in the closed position and the reservoir shutoff valve 156 is in the open position.

Initially, the first state will be described. When the master cylinder 66 is in the first state, the input chamber 140 and the annular chamber 132 are communicated with each other, and these chambers 140, 132 are communicated with the simulator chamber 166 of the stroke simulator 160, and are shut off from the reservoir 122. When the brake pedal 64 is depressed, the input piston 106 is advanced relative to the pressurizing piston 104, and the working fluid of the input chamber 140 is supplied to the simulator chamber 166, so as to operate the stroke simulator 160. Meanwhile, the annular chamber 132 and the input chamber 140 are in communication with each other; therefore, the hydraulic pressures of these chambers 132, 140 are at the same level. Also, the area of a pressure-receiving face of the middle piston portion 128 opposed to the annular chamber 132 is equal to the area of a pressure-receiving face of the rear small-diameter portion 130 opposed to the input chamber 140. Accordingly, the force applied to the pressurizing piston 104 in the advancing direction due to the hydraulic pressure of the input chamber 140 is balanced with the force applied to the piston 104 in the retracting direction due to the hydraulic pressure of the annular chamber 132, and the pressurizing piston, 104 is not advanced in response to the operation of the brake pedal 64. If a hydraulic pressure is supplied to the back chamber 136, the pressurizing piston 104 is advanced due to the force applied thereto in the advancing direction and corresponding to the hydraulic pressure of the back chamber 136, and hydraulic pressure commensurate with or corresponding to the hydraulic pressure of the back chamber 136 is generated in the front pressurizing chambers 110, 112. In other words, a predetermined relationship is established between the hydraulic pressure of the front pressurizing chambers 110, 112 and the hydraulic pressure of the back chamber 136. When the master cylinder 66 is in the first state, the input chamber 140 is in communication with the stroke simulator 160, and therefore, the operating feeling of the brake pedal 64 is determined by characteristics of the stroke simulator 160. The operating feeling is determined based on the relationship between the operating force applied to the brake pedal 64 and the operating stroke.

The hydraulic pressure of the back chamber 136, namely, the servo hydraulic pressure Psb, is controlled in the back pressure control device 68. In the regulator 182, when the control piston 204 is placed at its retracting end position, a front end portion of the valve opening member 234 is located rewardly of the valve spool 224. The servo pressure chamber 214 is communicated with the reservoir 122 via the low-pressure port communication channel 239, and the reservoir passage 244, and the servo hydraulic pressure Psb is equal to the atmospheric pressure. Thus, while no hydraulic pressure is supplied to the control chamber 212, the servo pressure chamber 214 is communicated with the reservoir 122, and the back chamber 136 of the master cylinder 66 is communicated with the reservoir 122 via the regulator 182. As a result, no hydraulic pressure is supplied to the back pressure 136, and the pressurizing pistons 102, 104 are not advanced due to the hydraulic pressure of the back chamber 136.

If a control hydraulic pressure Psi as an actual hydraulic pressure of the control chamber 212 is increased, and the force applied to the control piston 204 in the advancing direction becomes larger than the bias force Fsb of the spring 240, the control piston 204 is advanced. As a result, the valve opening member 234 abuts on the valve spool 224, and the servo pressure chamber 214 is shut off from the reservoir 122. The control piston 204 receives force (Psi×Asi) of a magnitude obtained by multiplying the control hydraulic pressure Psi by the area Asi of a pressure-receiving face of the control piston 204 opposed to the control chamber 212, force (Psb× Asb) of a magnitude obtained by multiplying the servo hydraulic pressure (output hydraulic pressure) as the actual hydraulic pressure of the servo pressure chamber 214 by the area Asb of a pressure-receiving face of the control piston 204 opposed to the servo pressure chamber 212, and the bias force Fsb of the spring 240. Since the spring 240 has a small spring constant, the bias force Fsb may be considered as being substantially constant (force corresponding to a set load). It follows that the following equation (1) is established with respect to the control piston 204.

$$Psi \times Asi = Psb \times Asb + Fsb \tag{1}$$

As the control hydraulic pressure Psi is further increased, the valve opening member 234 causes the valve spool 224 to be spaced apart from the valve seat 220, and the high-pressure supply valve 216 is placed in an open position. As a result, the servo pressure chamber 214 and the high-pressure chamber 206 are brought into communication with each other, and the servo hydraulic pressure Psb is increased. On the other hand, if the control hydraulic pressure Psi is reduced relative to the servo hydraulic pressure Psb, the control piston 204 is retracted, and the high-pressure supply valve 216 is placed in a closed position. If the valve opening member 234 is spaced apart from the valve spool 224, the servo pressure chamber 214 is brought into communication with the reservoir 122, and the servo hydraulic pressure Psb is reduced. It may be considered that the high-pressure supply valve 216, valve opening member 234, low-pressure port communication channel 239, etc. constitute a servo pressure control valve device. With the servo pressure control valve device, the servo pressure chamber 214 is selectively, communicated with the high-pressure source 180 and the reservoir 122, so that the hydraulic pressure of the servo pressure chamber 214 is increased or reduced.

In this embodiment, required total braking force Fref requested by the driver is obtained based on at least one of the detected value F of the operating hydraulic pressure sensor 170 and the detected value S of the operating stroke sensor 180. The required total braking force Fref is obtained according to the following equation (2), where γ represents the weight of the operating stroke.

$$Fref = S \times \gamma + F \times (1-\gamma) \tag{2}$$

If the required total braking force is satisfied by regenerative braking force in the case where regeneration coordination control is performed, the required hydraulic braking force is set to 0, and no hydraulic pressure is supplied to the back chamber 136, so that no hydraulic pressure is generated in the front pressurizing chambers 110, 112. On the other hand, if the required total braking force is not satisfied by regenerative braking force, the required hydraulic braking force is set to a value larger than 0, and a target hydraulic pressure of the brake cylinders 42, 52, namely, a target hydraulic pressure of the front pressurizing chambers 110, 112, is determined, and a target hydraulic pressure Pref of the back pressure 136 is determined, so that the required hydraulic braking force is satisfied. In the case where regeneration coordination control is not performed, and the case where the hydraulic brake system is installed on a vehicle driven by an internal combustion driving source, the required total braking force is set as the required hydraulic braking force, and the target hydraulic pressure Pref of the back chamber 136 is determined so as to satisfy the required total braking force.

In the regulator 182, the target hydraulic pressure Pref of the back chamber 136 is set as a target servo hydraulic pressure Psbref as a target hydraulic pressure of the servo pressure chamber 214 (Pref=Psbref). Also, a target control hydraulic pressure Psiref as a target hydraulic pressure of the control chamber 212 is obtained based on the relationship between the servo hydraulic pressure Psb and the control hydraulic pressure Psi as indicated by Eq. (1) above, for example, and the target servo hydraulic pressure, Psbref, and the control hydraulic pressure Psi is estimated based on the relationship as indicated by Eq. (1) and the servo hydraulic pressure Psb detected by the servo hydraulic pressure sensor 243. Then, the pressure-increasing linear control valve 250 and the pressure-reducing linear control valve 252 are controlled so that the control hydraulic pressure Psi approaches the target control hydraulic pressure Psiref, whereby the servo hydraulic pressure Psb approaches the target servo hydraulic pressure Psbref, and the hydraulic pressure of the back chamber 136 approaches the target hydraulic pressure Pref. As described above, when the master cylinder 66 is in the first state, the master cylinder 66 functions as a part of the stroke simulator; therefore, the first state may be called "stroke simulator state". Also, the hydraulic pressure of the control chamber 212 is controlled by the pressure-increasing linear control valve 250 and the pressure-reducing linear control valve 252 in the regulator 182, so that the hydraulic pressure of the front pressurizing chambers 110, 112 is controlled; therefore, the first state may also be called "linear control state". In either case, when the master cylinder 66 is in the first state, the hydraulic pressure of the front pressurizing chambers 110, 112 is controlled by the regulator 182, or no hydraulic pressure is generated in the front pressurizing chambers 110, 112.

Next, the second state will be described. When the master cylinder 66 is in the second state, the input chamber 140 is shut off from the annular chamber 132, reservoir 122, and the stroke simulator 160, and the annular chamber 132 is communicated with the reservoir 122. Since the input chamber 140 is placed in a so-called confined condition, the input piston 106 is inhibited from moving relative to the pressurizing piston 104. If the brake pedal 64 is depressed, the input piston 106 is advanced, the pressurizing pistons 102, 104 are advanced against the bias force of the return springs 118, 120, and a hydraulic pressure commensurate with the operating force is generated in the front pressurizing chambers 110, 112. In the second state, the operating feeling of the brake pedal 64 is determined by the return springs 118, 120, etc. In the regulator 182, the hydraulic pressure of the front pressurizing chamber 112 is supplied to the pilot chamber 210, so that the pilot piston 202 is advanced, and the control piston 204 is advanced; as a result, a hydraulic pressure is generated in the servo pressure chamber 214. The hydraulic pressure of the servo pressure chamber 214 is supplied to the back chamber 136, and is applied to the pressurizing piston 104. Thus, when the master cylinder 66 is in the second state, hydraulic pressure is generated in the front pressurizing chambers 110, 112, owing to the operation of the brake pedal 64; therefore, the second state may be called "manual pressurizing state". Since assistive force is applied from the regulator 182, the second state may also be called "booster operating state".

Next, switching between the first state and the second state will be described. As a principle, the master cylinder 66 is placed in the first state when the hydraulic brake system is in a normal condition, and is placed in the second state when the hydraulic brake system is in an abnormal condition. Also, the master cylinder 66 is placed in the first state when the ignition switch 284 is ON, and is placed in the second state when the ignition switch 284 is OFF. More specifically, where the hydraulic brake system is in a normal condition, the master cylinder 66 is in the second state during a period from the start of application of electric current to the brake ECU 56 to the time when the communication control valve 152 is actually switched to the open position, and the reservoir shutoff valve 156 is actually switched to the closed position. When current is applied to the brake ECU 56, the brake ECU 56 starts making preparations, such as reading of programs, for execution of the programs. After the preparations are completed, a command to switch the master cylinder 66 from the second state to the first state (which may be simply called "command for switching to the first state") is issued. Then, current is supplied to the solenoids of the communication control valve 152 and the reservoir shutoff valve 156, so that the master cylinder 66 is switched to the first state.

Figure 10A:
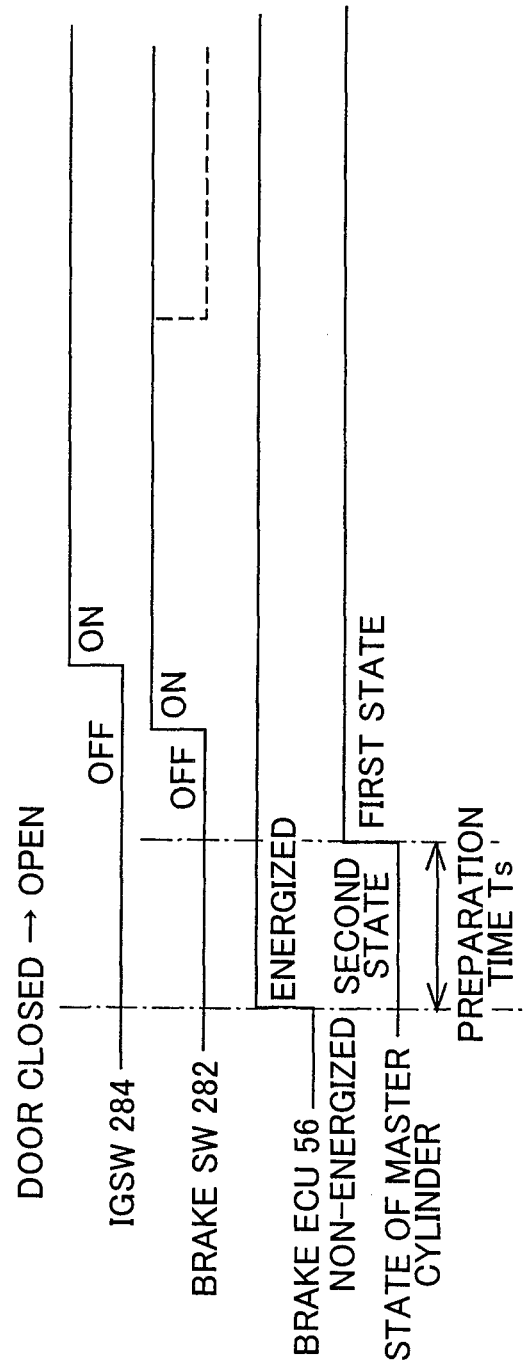
FIG. 10A is a view useful for explaining the case where the master cylinder is switched between the second state and the first state (where switching-time change suppression control is not performed), in the hydraulic brake system, showing changes in a condition of energization of the brake ECU, an ON/OFF state of a brake switch, and an ON/OFF state of an ignition switch, in the case where the ignition switch is turned on before a reset time elapses after the door is opened.

As shown in FIG. 10A, current is applied to the brake ECU 56 when the door open/close switch 286 is switched to ON, which serves as a trigger, in a condition where the ignition switch 284 is OFF. Then, the master cylinder 66 is switched to the first state after the brake ECU 56 makes preparations for execution of programs, as described above. Generally, a preparation time Ts is required from application of current to the brake ECU 56 to switching of the master cylinder 66 to the first state. The driver usually opens the door on the side of the driver's seat, gets into the vehicle, depresses the brake pedal 640, and turns on the ignition switch 284, and the preparation time Ts as measured from the time at which the driver opens the door normally elapses by the time at which the driver depresses the brake pedal 640. Therefore, in most cases, the brake pedal 64 is depressed after the master cylinder 66 is switched to the first state. Then, the ignition switch 284 is turned on. While the ignition switch 284 is held in the ON position, current is kept applied to the brake ECU 56, and the master cylinder 66 is held in the first state, irrespective of whether or not the brake pedal 64 is operated.

On the other hand, even if current is applied to the brake ECU 56 when the door on the side of the driver' seat is opened, and the master cylinder 66 is placed in the first state, the ignition switch 284 may not be turned on until after a predetermined reset time Tf elapses, as shown in FIG. 10B. In this case, the brake ECU 56 is returned to a non-energized condition, and the master cylinder 66 is returned to the second state. Thereafter, current is applied to the brake ECU 56 when the brake switch 282 is switched from OFF to ON, which serves as a trigger, and the master cylinder 66 is switched to the first state after the preparation time Ts elapses. For example, this is the case where the driver does not immediately get into the vehicle after he/she opens the door on the side of the driver's seat, or the case where the ignition switch 284 is not immediately turned on even if the driver gets into the vehicle. The reset time Tf may be set to a period of time that is assumed to indicate that the driver has no intention of immediately starting the vehicle.

If the reset time Tf elapses from switching of the ignition switch 284 from ON to OFF, the brake ECU 56 is returned to a non-energized condition, and the master cylinder 66 is returned to the second state, as shown in FIG. 10C. Thereafter, the driver may start the vehicle without getting off the vehicle. In this case, current is applied to the brake ECU 56 when the brake switch 288 is switched from OFF to ON, which serves as a trigger, and the master cylinder 66 is switched to the first state after a lapse of the preparation time Ts.

Next, control for suppressing change at the time of switching (which will be called "switching-time change suppression control") will be described. If the master cylinder 66 is switched from the second state to the first state while the brake pedal 64 is being depressed, as shown in FIG. 10B and FIG. 10C, the operating feeling changes, and the driver may feel uncomfortable or has a feeling of strangeness. In the second state, the hydraulic pressure of the annular chamber 132 is substantially equal to the atmospheric pressure (the hydraulic pressure of the reservoir 122), and the hydraulic, pressure of the input chamber 140 is commensurate with or proportional to the operating force applied to the brake pedal 64. However, if the master cylinder 66 is switched to the first state, and the input chamber 140 and the annular chamber 132 are brought into communication with each other, the hydraulic pressure of the input chamber 140 is rapidly reduced, and reaction force applied to the brake pedal 64 is rapidly reduced. Further, a pedal shock may occur such as when the brake pedal 64 sinks down. In this embodiment, the switching-time change suppression control is performed when the master cylinder 66 is switched from the second state to the first state. In the switching-time change suppression control, the communication control valve 152 is switched alternately between the open position and the closed position while the reservoir shutoff valve 156 is in the closed position, as shown in FIG. 3. Namely, duty control is performed on the communication control valve 152. The switching-time change suppression control is started when a command for switching to the first state is issued, and ends when a switching-time control duration (set time) elapses.

Figure 8:
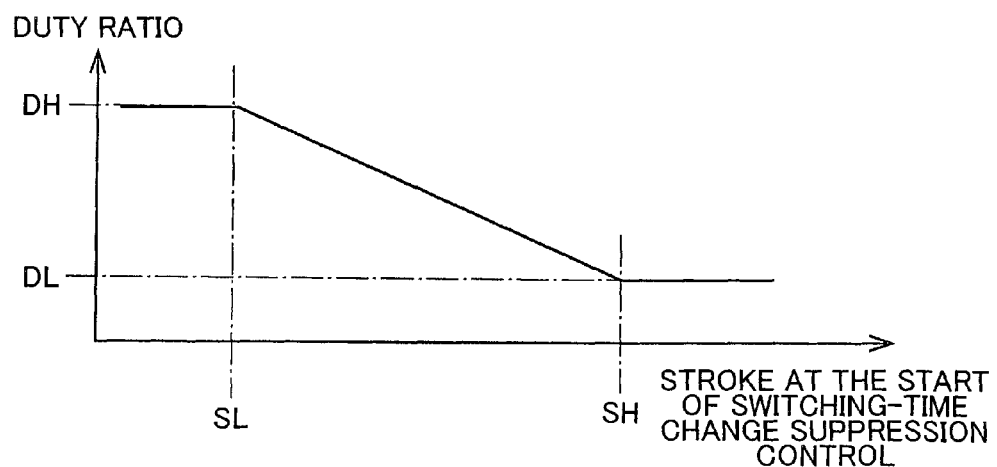
FIG. 8 is a map representing a duty-ratio determination table stored in the storage unit of the brake ECU.

The duty ratio of the duty control at the start of the switching-time change suppression control is determined according to a duty-ratio determination table of FIG. 8, based on the operating stoke of the brake pedal 64 detected by the stroke sensor 280 when the command for switching to the first state is issued (i.e., immediately before the switching-time change suppression control is started). In this embodiment, the duty ratio is represented by the ratio {Ton/(Ton+Toff)} of the ON time to the cycle time. In the duty-ratio determination table of FIG. 8, the duty ratio is determined such that its value is reduced, and the ON time is reduced, as the operating stroke is larger. Also, the duty ratio is variable between the upper limit and the lower limit, and the duty ratio is set to the lower limit DL when the operating stroke is larger than a first set value SH, while the duty ratio is set to the upper limit DH when the operating stroke is smaller than a second set value SL. As the hydraulic pressure of the input chamber 140 at the time of switching from the second state to the first state is higher, a difference in the hydraulic pressure between the input chamber 140 and the annular chamber 132 is larger, and the rate of reduction in the hydraulic pressure of the input chamber 140 is larger. In the second state, since the operating hydraulic pressure sensor 170 is shut off from the input chamber 140, the hydraulic pressure of the input chamber 140 cannot be directly detected. However, in the second state, the hydraulic pressure of the input chamber 140 can be estimated to be higher as the operating stroke is larger. Also, since the operating feeling in the second state is determined by the return springs 118, 120, etc., the operating force will be found if the operating stroke is found. The duty-ratio determination table is created in view of the above situations, and the duty ratio is reduced as the operating stroke detected when the switching-time change suppression control is started is larger. In this manner, change in the hydraulic pressure of the input chamber 140 when the input chamber 140 is communicated with the annular chamber 132 can be suppressed or reduced. Also, a difference in the rate of reduction of the hydraulic pressure of the input chamber 140, between the case where the hydraulic pressure of the input chamber 140 when the switching-time change suppression control is started is high, and the case where the hydraulic pressure of the input chamber 140 is low, can be advantageously reduced.

The switching-time change suppression control is performed for a predetermined switching-time control duration. If the length of time for which the switching-time change suppression control is performed is too short, the effect of alleviating the discomfort or feeling of strangeness and reducing the pedal shock may not be sufficiently obtained. If the length of control time is too long, the driver or passenger may be concerned about operating noise, for example. Thus, the switching-time control duration is determined in view of the problems as described above. In this embodiment, the duty ratio is gradually increased as time passes, during the switching-time control duration, so that the duty ratio becomes equal to 1 (OFF time Toff=0) at the time when the switching-time change suppression control ends, and communication between the input chamber 140 and the annular chamber 132 is gradually changed from a shut-off condition to a communicating condition. Thus, duty control is performed on the communication control valve 152 under the switching-time change suppression control. Since the duty ratio is gradually increased, the operating feeling is changed at a further reduced rate.

If the detected value of the operating hydraulic pressure sensor 170 is equal to or larger than an abnormality determination threshold value after a determination time elapses from the start of the switching-time change suppression control, it is determined that the communication control valve 152 is in a normal condition. If the detected value of the operating hydraulic pressure sensor 170 is smaller than the abnormality determination threshold value, it is determined that the communication control valve 152 is in an abnormal condition in which the valve 152 is stuck in the closed position. Immediately before the start of the switching-time change suppression control, the hydraulic pressure of the annular chamber 132 is substantially equal to the atmospheric pressure, and therefore, the detected value of the operating hydraulic pressure sensor 170 is substantially equal to 0 (value corresponding to the atmospheric pressure). If the communication control valve 152 is duty-controlled while the reservoir shutoff valve 156 is in the closed position, the hydraulic pressure of the annular chamber 132 gradually increases, and the detected value of the operating hydraulic pressure sensor 170 increases so that it reaches a value that is equal to or larger than the abnormality determination threshold value after a lapse of the determination time. However, if the detected value is smaller than the abnormality determination threshold value after the lapse of the determination time, it may be concluded that the communication control valve 152 is held in the closed position (i.e., the communication control valve 152 is abnormally stuck in the closed position). In this embodiment, it is determined during the switching-time change suppression control whether the communication control valve 152 is in an abnormal condition in which the valve 152 is stuck in the closed position. In other words, the determination time is made shorter than the switching-time control duration. While the determination time and the abnormality determination threshold value are fixed, values in this embodiment, these values may be variable values that are determined based on the hydraulic pressure of the input chamber 140 (the magnitude of the operating stroke) detected when the switching-time change suppression control is started.

If an abnormality of the communication control valve 152 stuck in the closed position is detected, the switching-time change suppression control is discontinued or cancelled, and the master cylinder 66 is switched to the second state. It is thus possible to reduce a change in the operating feeling when the master cylinder 66 is switched to the second state, as compared with the case where the master cylinder 66 is switched to the second state when an abnormality of the communication control valve 152 stuck in the closed position is detected, after the switching-time change suppression control is completed and the master cylinder 66 is placed in the first state. After the abnormality of the communication control valve 152 stuck in the closed position is detected, the master cylinder 66 will not be switched to the first state.

The operating feeling, namely, the relationship between the operating stroke and the operating force, differs between the case where the master cylinder 66 is switched from the second state to the first state while the brake pedal 64 is being operated (for example, the cases of FIG. 10B and FIG. 10C), and the case where the master cylinder 66 is in the first state when the brake pedal 64 starts being operated (for example, the case of FIG. 10A). For example, when the master cylinder 66 is in the first state from the start of operation of the brake pedal 64, the operating feeling is determined by the stroke simulator 160, and is represented by the relationship between the operating stroke indicated by the broken line in FIG. 9 and the hydraulic pressure of the input chamber 140 indicated by the two-dot chain line. The hydraulic pressure of the input chamber 140 is correlated with the operating force. On the other hand, the operating feeling when the master cylinder 66 is in the second state is determined by the return springs 118, 120, etc., and is represented by the relationship between the operating stroke indicated by the broken line in FIG. 9 and the hydraulic pressure of the input chamber 140 indicated by the solid line. This hydraulic pressure of the input chamber 140 is also correlated with the operating force. When the master cylinder 66 is switched from the second state to the first state while the brake pedal 64 is being operated, the stroke simulator 160 is started from the start of the duty control, and therefore, the operating force is likely to be small relative to the operating stroke. Also, when the operating stroke is in the vicinity of the full stroke, the operating force cannot be sufficiently restored due to characteristics of the stroke simulator 160. As a result, the operating feeling is likely to be represented by the relationship between the operating stroke indicated by the broken line in FIG. 9 and the hydraulic pressure of the input chamber 140 indicated by the one-dot chain line (in FIG. 9). The hydraulic pressure of the input chamber 140 is also correlated with the operating force. It may be concluded from the above description that, when the master cylinder 66 is switched from the second state to the first state, the operating stroke, rather than the operating force, reflects the intention of the driver more with higher accuracy, during execution of the switching-time change suppression control, and after the master cylinder 66 is switched to the first state.

In the meantime, when the master cylinder 66 is in the first state, the target hydraulic pressure Pref of the back chamber 136 is determined based on the required total braking force Fref and the regenerative braking force, and the required total braking force Fref is determined according to the above equation (2), as described above. In this case, when the master cylinder 66 is switched to the first state while the brake pedal 64 is being operated, the weight γ of the operating stroke S is increased, as compared with the case where the master cylinder 66 is in the first state from the start of operation of the brake pedal 64. As a result, even in the case where the master cylinder 66 is switched from the second state to the first state, the intention of the driver can be favorably reflected by the required total braking force Fref, and the braking feeling is prevented from being deteriorated. The weight γ may be set to 1.

Figure 4A:
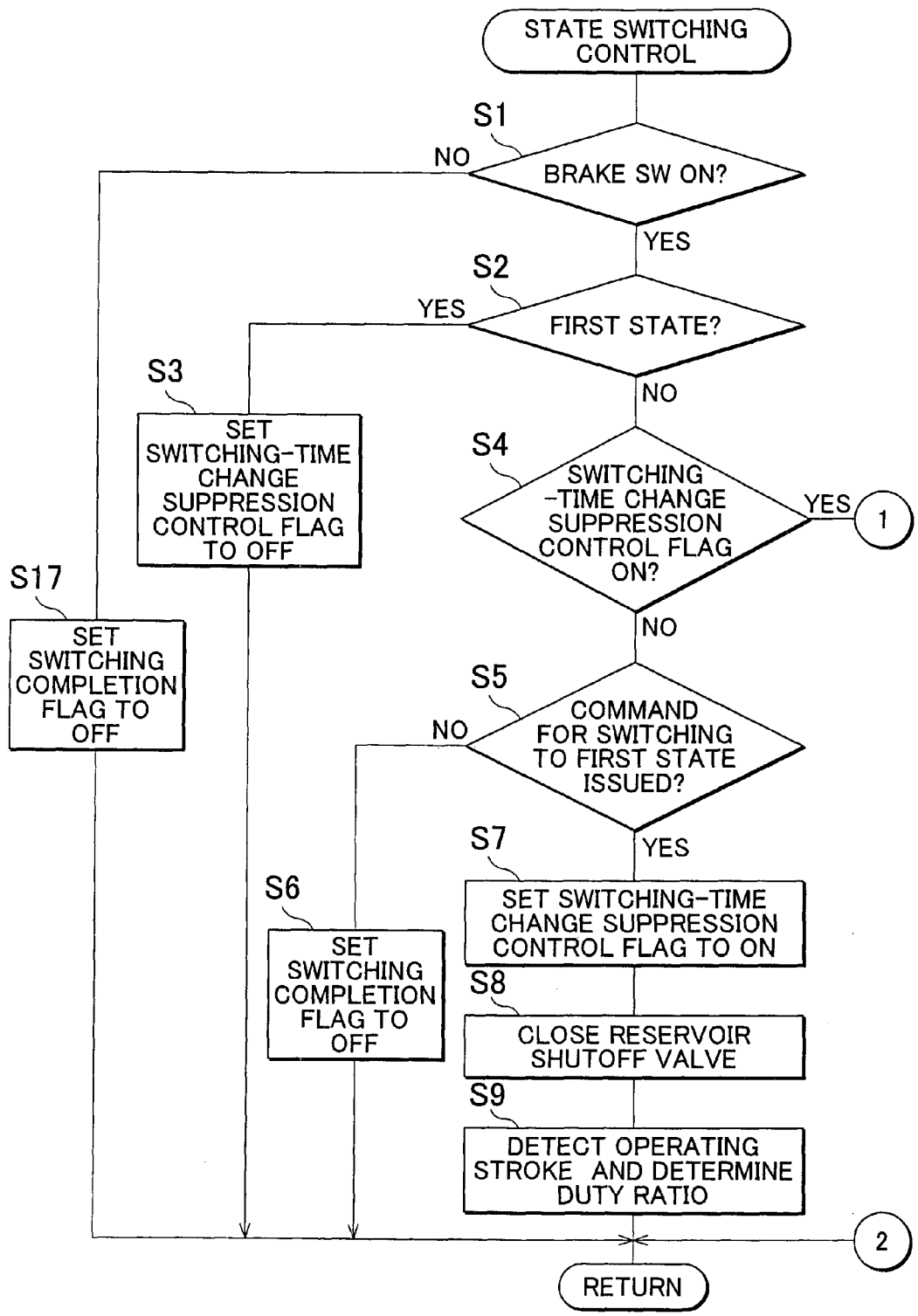
FIGS. 4A and 4B are flowcharts illustrating a state switching control program stored in a storage unit of a brake ECU of the hydraulic brake system.
Figure 4B:
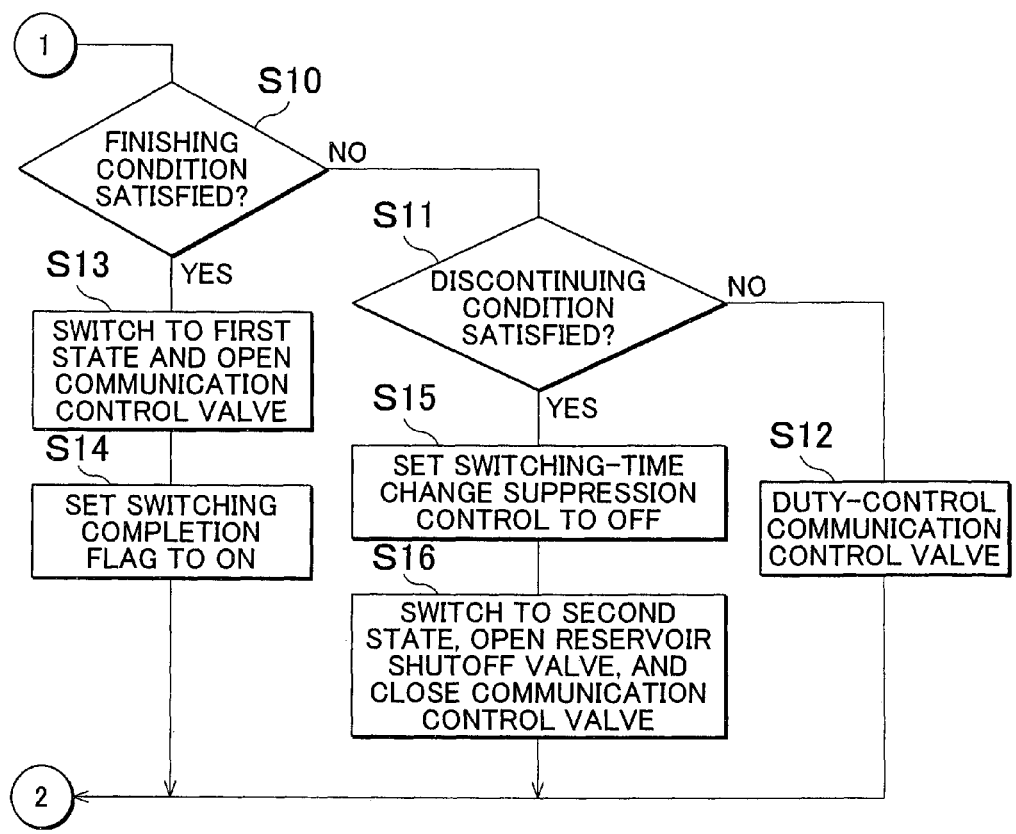

A state switching control program illustrated in the flowcharts of FIGS. 4A and 4B is executed at predetermined time intervals. In step S1, it is determined whether the brake switch 282 is ON, and it is determined, in step S2, whether the master cylinder 66 is in the first state. If the brake switch 282 is ON, and the master cylinder 66 is in the first state, affirmative decisions (YES) are made in steps S1, S2, and a switching-time change suppression control flag is set to OFF (initialized). The switching-time change suppression control flag is ON while the switching-time change suppression control is being performed. On the other hand, if the master cylinder 66 is not in the first state, it is determined in step S4 whether the switching-time change suppression control flag is ON, and it is determined in step S5 whether a command for switching to the first state has been issued. While the switching-time change suppression control flag is OFF, and the command for switching to the first state is not issued, negative decisions (NO) are made in steps S4, S5, and a switching completion flag is set to OFF (initialized) in step S6. The switching completion flag is set to ON when the master cylinder 66 is switched from the second state to the first state. When the master cylinder 66 is in the first state at the time when the brake pedal 64 is depressed, as shown in FIG. 10A, affirmative decisions (YES) are made in steps S1, S2, and steps S1-S3 are repeatedly executed. On the other hand, when the brake pedal 64 is depressed while the master cylinder 66 is in the second state, and no command for switching to the first state has been issued, as shown in FIGS. 10B, 10C, steps S1, S2, S4, S5, S6 are executed. If a command for switching to the first state is issued while steps S1, S2, S4, S5, S6 are repeatedly executed, an affirmative decision (YES) is made in step S5, the switching-time change suppression control flag is set to ON in step S7, and the reservoir shutoff valve 156 is placed in the closed position in step S8. In the following step S9, the operating stroke is detected, and the duty ratio at the start of the switching-time change suppression control is determined according to the table of FIG. 8.

When the program illustrated in the flowchart of FIG. 4 is executed next time, an affirmative decision (YES) is made in step S4 since the switching-time change suppression control flag is ON, and it is determined in step S10-whether a finishing condition under which the switching-time change suppression control is finished is satisfied. If a negative decision (NO) is made in step S10, it is determined in step S11 whether a discontinuing condition under which the switching-time change suppression control is discontinued is satisfied. If neither the finishing condition nor the discontinuing condition is satisfied, the switching-time change suppression control is performed in step S12. Namely, the duty control of the communication control valve 152 is performed. The finishing condition is that the switching-time control duration has elapsed, and the discontinuing condition is that an abnormality of the communication control valve 152 stuck in the closed position is detected. If the finishing condition is satisfied while steps S1, S2, S4, S10-S12 are repeatedly executed, the control goes to step S13 in which the master cylinder 66 is placed in the first state, and the communication control valve 152 is placed in a fully open condition (the duty ratio is set to 1), and then goes to step S14 in which the switching completion flag is set to ON. When the program of FIG. 4 is executed next time, an affirmative decision (YES) is made in step S2 since the master cylinder 66 is in the first state, and the switching-time change suppression control flag is set to OFF in step S3. Subsequently, steps S1-S3 are repeatedly executed.

On the other hand, if an abnormality of the communication control valve 152 stuck in the closed position is detected while steps S1, S2, S4, S10-S12 are repeatedly executed, an affirmative decision (YES) is made in step S11, and the control goes to step S15 in which the switching-time change suppression control flag is set to OFF (the switching-time change suppression control is discontinued), and then goes to step S16 in which the master cylinder 66 is returned to the second state. In this state, the communication control valve 152 is placed in the closed position, and the reservoir shutoff valve 156 is switched to the open position. Subsequently, steps S1, S2, S4, S5 and S6 are repeatedly executed. When an abnormality of the communication control valve 152 stuck in the closed position is detected, no command for switching to the first state is issued after the detection of the abnormality; therefore, step S7 and subsequent steps will not be executed. When the brake switch 282 is OFF, a negative decision (NO) is made in step S1, and the switching completion flag is set to OFF in step S17. For example, if the brake pedal 64 is released after the master cylinder 66 is switched from the second state to the first state while the brake pedal 64 is being operated, and then the brake pedal 64 is depressed again while the ignition switch 284 is kept from being OFF (i.e., the ignition switch 284 is held ON), the master cylinder 66 is in the first state. In this case, if the switching completion flag is ON, step S84 (FIG. 7) would be executed when the target hydraulic pressure of the back chamber 136 is determined; thus, the weight a of the operating stroke S is increased, and the target hydraulic pressure cannot accurately represent the intention of the driver. To prevent this situation, the switching completion flag is set to OFF when the brake switch 272 is OFF.

Figure 5:
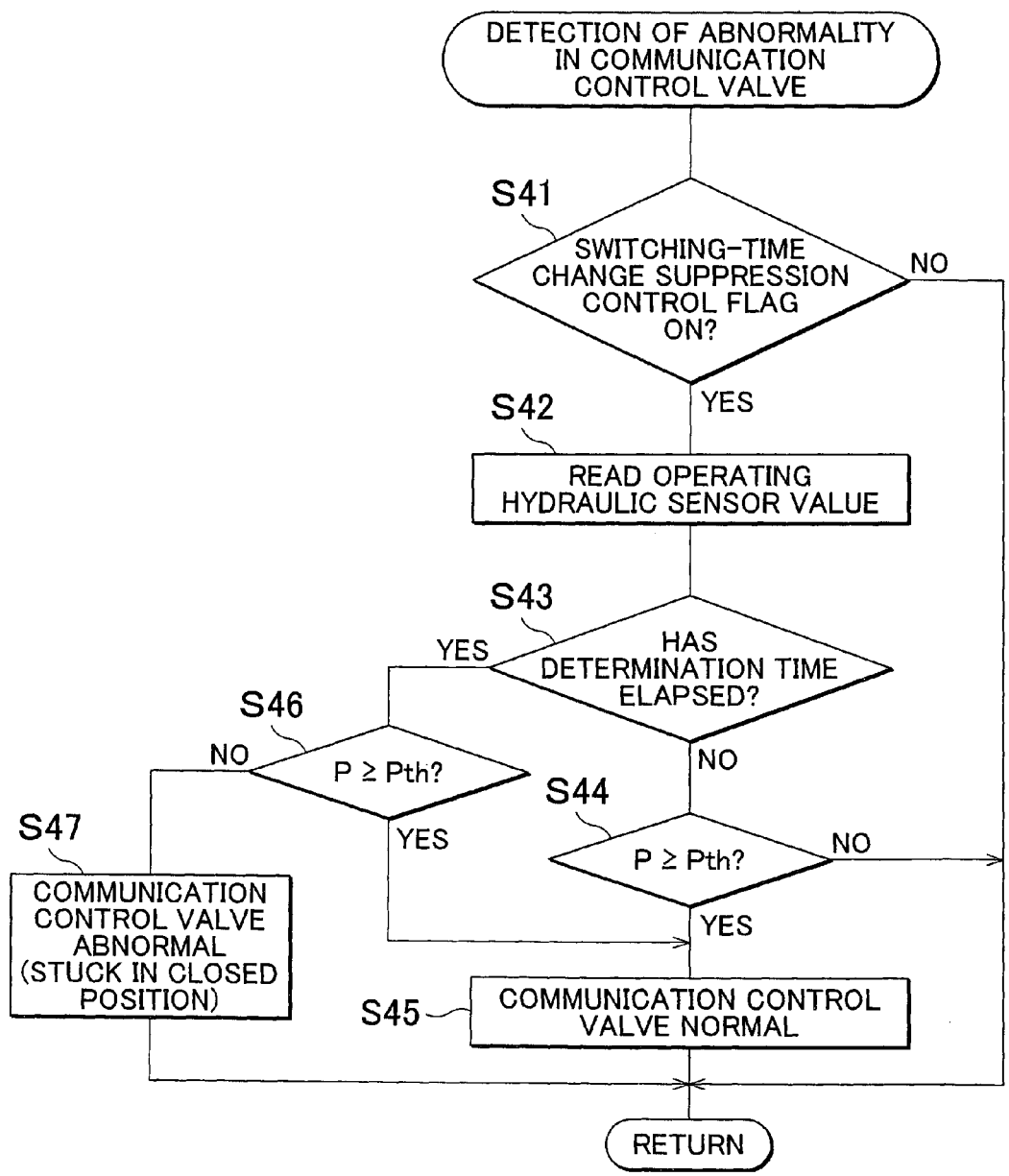
FIG. 5 is a flowchart illustrating a communication control valve abnormality detection program stored in the storage unit of the brake ECU.

An abnormality of the communication control valve is detected by executing the program of FIG. 5. In step S41, it is determined whether the switching-time change suppression control flag is ON. When this flag is ON, the detected value P of the operating hydraulic pressure sensor 170 is read in step S42. It is then determined in step S43 whether the determination time has elapsed since the switching-time change suppression control was started. Before the determination time elapses, it is determined in step S44 whether the detected value P of the operating hydraulic pressure sensor 170 is equal to or larger than an abnormality determination threshold value Pth. Steps S41-S44 are repeatedly executed before the determination time elapses. If the detected value P becomes equal to or larger than the abnormality determination threshold value Pth, it is determined in step S45 that the communication control valve 152 is in a normal condition. On the other hand, if the determination time elapses, an affirmative decision (YES) is made in step S43, and it is determined in step S46 whether the detected value P is equal to or larger than the abnormality determination threshold value Pth. If the detected value P is smaller than the abnormality determination threshold value Pth, it is determined in step S47 that the communication control valve 152 is in an abnormal condition in which the valve is stuck in the closed position. If the communication control valve 152 is abnormally stuck in the closed position, the discontinuing condition is satisfied, and an affirmative decision (YES) is made in step S11. In this case, the master cylinder 66 is returned to the second state in step S16.

Figure 9:
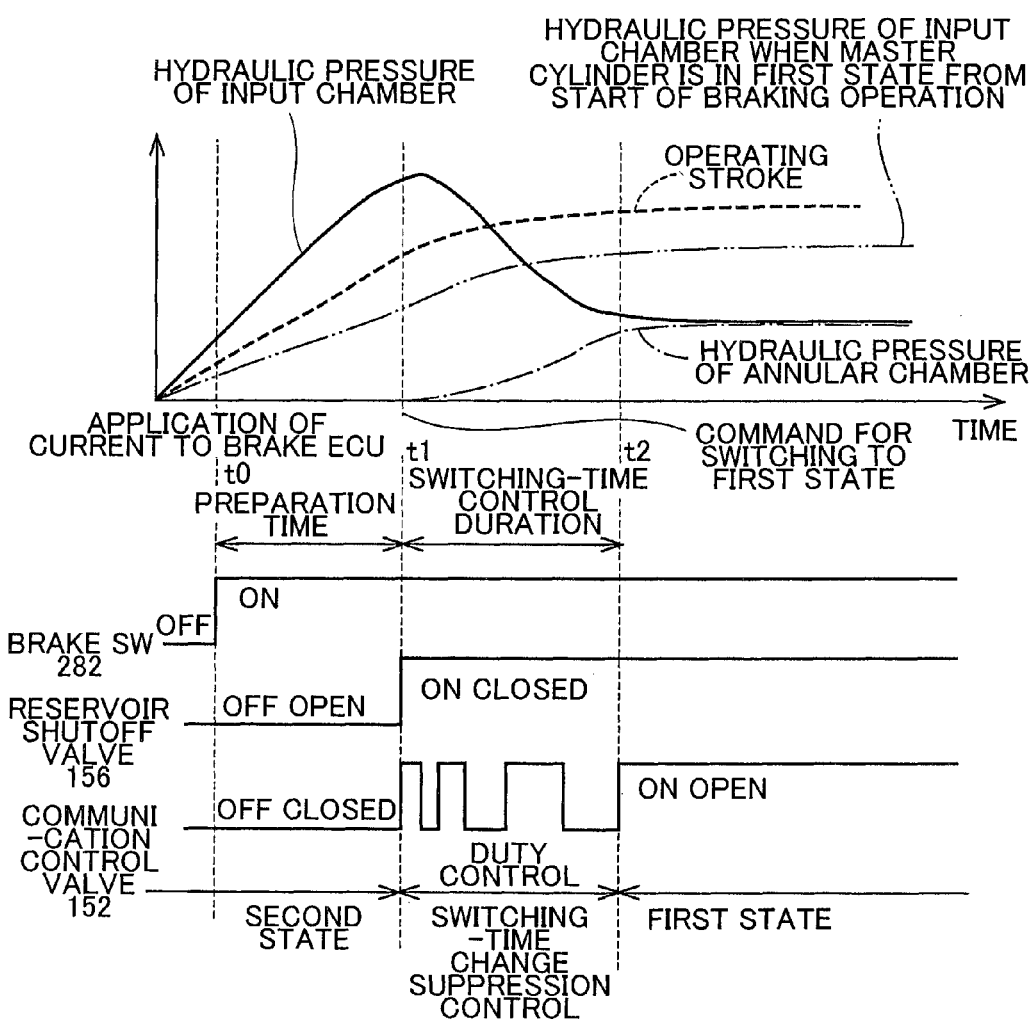
FIG. 9 is a view showing changes in the operating stroke and the operating force when the state switching control program is implemented.

A specific control example is illustrated in FIG. 9. If the brake pedal 64 is depressed while the master cylinder 66 is in the second state, the brake switch 282 is switched from OFF to ON at time t0, and current is applied to the brake ECU 56. At time t1, a command for switching to the first state is generated, and switching-time change suppression control is started. Specifically, the reservoir shutoff valve 156 is placed in the closed position, and duty control is performed on the communication control valve 152. If the switching-time control duration elapses at time t2, the duty ratio is set to 1, and the communication control valve 152 is placed in the open position. In the switching-time change suppression control, the duty ratio is increased as time passes, and is made equal to 1 at the time when the switching-time change suppression control ends. Thus, in this embodiment, when the master cylinder is switched from the second state to the first state, the switching-time change suppression control is performed, and duty control is performed on the communication control valve 152. In this case, since the operating stroke is in the vicinity of the full stroke, the operating stroke is kept substantially constant, and the reaction force is slowly reduced down to a magnitude determined by the stroke simulator 160. As a result, the hydraulic pressure of the input chamber 140 is reduced at a reduced rate, and change in the reaction force is suppressed. Thus, change in the operating feeling is suppressed (i.e., the operating feeling is less likely to change), and pedal shock can be alleviated or eliminated.

Figure 6:
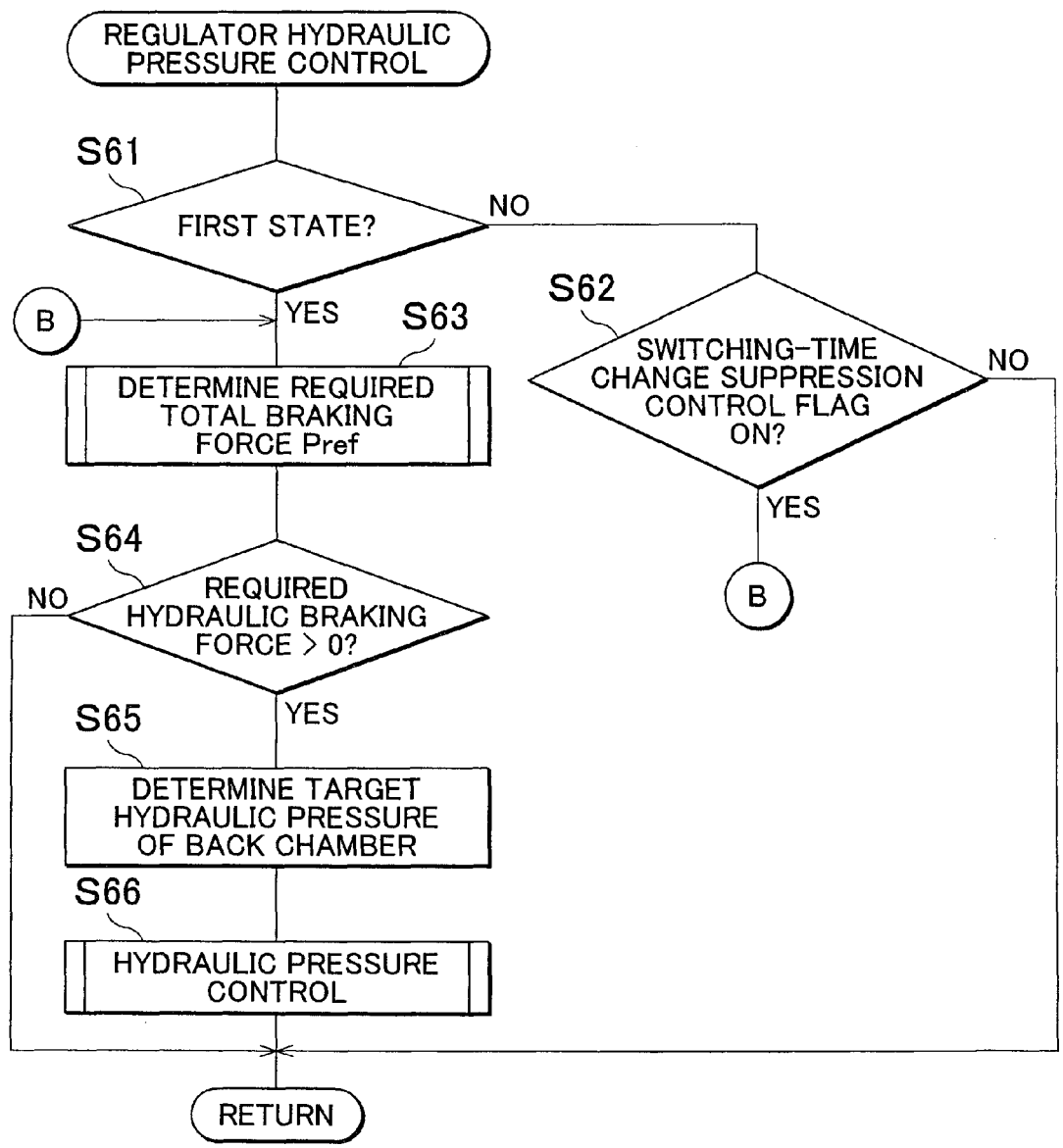
FIG. 6 is a flowchart illustrating a regulator hydraulic pressure control program stored in the storage unit of the brake ECU.

In this embodiment, when the master cylinder 66 is in the first state, or the switching-time change suppression control is being performed, a regulator hydraulic pressure control program illustrated in the flowchart of FIG. 6 is executed, so that the hydraulic pressure of the control chamber 212 is controlled, and the hydraulic pressure of the back chamber 136 of the master cylinder 66 is controlled. In steps S61, S62, it is determined whether the master cylinder 66 is in the first state, and whether the switching-time change suppression control is being performed. If an affirmative decision (YES) is made in step S61 or S62, the required total braking force is determined in step S63, and it is determined in step S64 whether the required hydraulic braking force is larger than 0 (whether there is a request for operating the hydraulic brakes 40, 50). If the required hydraulic braking force is larger than 0, the target hydraulic pressure Pref of the back chamber 136 is determined in step S65, and the hydraulic pressure of the control chamber 212 is controlled by means of the pressure-increasing linear control valve 250 and the pressure-reducing linear control valve 252 in step S66, so that the hydraulic pressure of the servo pressure chamber 214 approaches the target servo hydraulic pressure Psbref (the target hydraulic pressure Pref of the back chamber 136). On the other hand, if the required hydraulic braking force is 0, steps S65, S66 are not executed.

Figure 7:
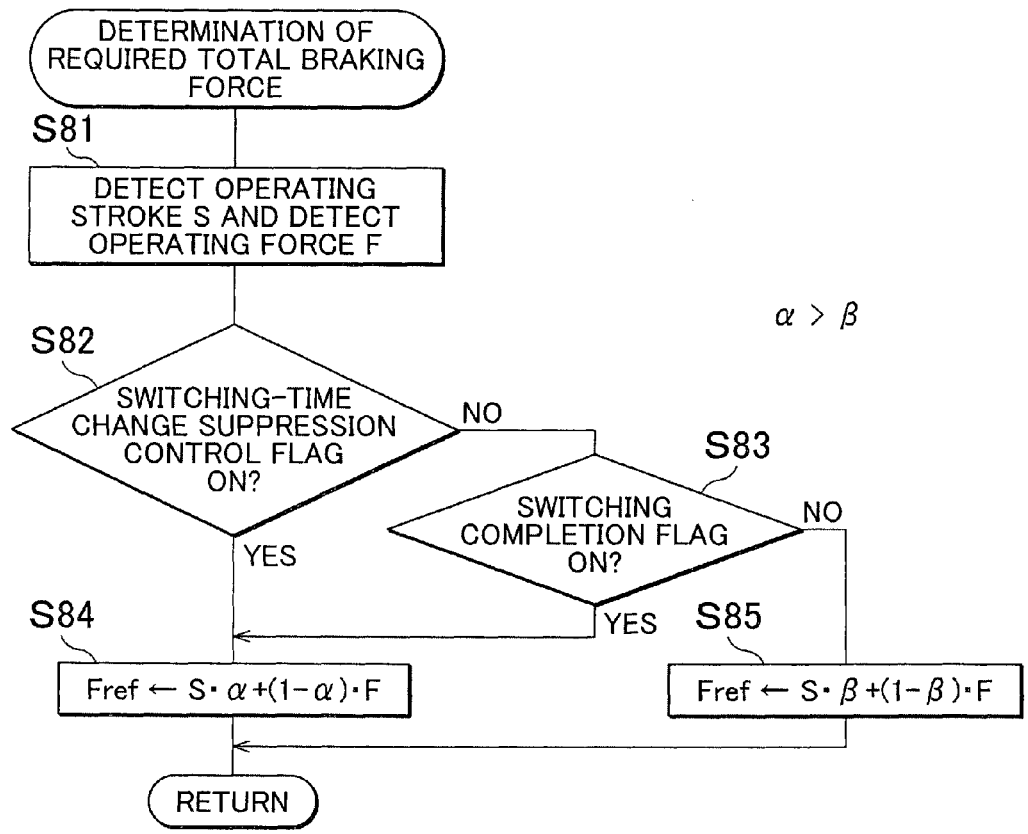
FIG. 7 is a flowchart illustrating a part of the regulator hydraulic pressure control program (for determining required total braking force of step S63)

The required total braking force is determined according to the subroutine of FIG. 7. In step S81, the detected values of the stroke sensor 280 and the operating hydraulic pressure sensor 170 are obtained. It is determined in step S82 whether the switching-time change suppression control flag is ON, and it is determined in step S83 whether the switching completion flag is ON. If either of these flags is ON, the required braking force is determined in step S84, according to the following equation (3).

$$Pref = S \times \alpha + (1-\alpha) \times F \quad (3)$$

If both of the above flags are OFF, namely, when the master cylinder 66 is in the first state from the start of operation of the brake pedal 64, the required total braking force is determined in step S85, according to the following equation (4).

$$Pref = S \times \beta + (1-\beta) \times F \quad (4)$$

The weight α is larger than the weight β (α>β). Thus, when the master cylinder 66 is switched from the second state to the first state after the brake switch 282 is turned on, the weight of the operating stroke S used when the target hydraulic pressure Pref of the back chamber 136 is determined (when the required total braking force Fref is determined) is made larger than that in the case where the master cylinder 66 is in the first state from the time when the brake switch 282 is turned on. As a result, even when the master cylinder 66 is witched to the first state while the brake pedal 64 is being operated, the hydraulic pressure of the back pressure 136 can be controlled to a level that matches or accurately represents the intention of the driver, and deterioration of the braking feeling can be reduced or curbed. While step S84 is executed, and the weight γ of the operating stroke is increased during the switching-time change suppression control, in this embodiment, step S85 may be executed. Also, step S85 may be executed during a period from the start of the switching-time change suppression control to a lapse of a set time, and step S84 may be executed after the set time elapses, until the switching-time control duration expires. Further, the weight β may be a default value. The weight α may be a variable value.

In this embodiment, the communication control valve 152, reservoir shutoff valve 156, a portion of the brake ECU 56 which stores steps S8, S9, S12, S13, S16 of the state switching control program of FIG. 4; and a portion of the brake ECU 56 which executes these steps, etc. constitute a master-cylinder state switching device, of which the communication control valve 152, reservoir shutoff valve 156, a portion of the brake ECU 56 which stores steps S8, S9, S12 of the state switching control program, and a portion thereof which executes these steps, etc. constitutes a switching-time change suppression unit. A portion of the switching-time change suppression unit which stores step S12, a portion thereof which executes step S12, etc. constitute an input chamber communication control unit, and a portion thereof which stores step S9, a portion thereof which executes step S9, etc. constitutes a duty ratio determining unit. The input chamber communication control unit may also be a solenoid valve control unit, or a communication valve duty control unit. The operating hydraulic pressure sensor 170, a portion of the brake ECU 56 which stores the communication control valve abnormality detection program, a portion thereof which executes the program, etc. constitute a communication control valve abnormality detecting unit, and a portion of the brake ECU 56 which stores step S16 of the state switching control program, and a portion thereof which executes step S16, etc. constitutes a switching unit that switches the master cylinder to the second state when an abnormality is detected. Also, the linear valve device 184, a portion of the brake ECU 56 which stores the regulator hydraulic pressure control program, a portion thereof which executes the program, etc. constitutes a brake cylinder hydraulic pressure control device, of which a portion that stores steps S63, S65, a portion that executes these steps, etc. constitutes a target hydraulic pressure determining unit, and a portion that stores the required total braking force determining routine, a portion that executes this routine, etc. constitutes a determining unit that determines the required total braking force in different modes.

When the operating stroke is smaller than the full stroke in the case where the master cylinder 66 is switched from the second state to the first state while the brake pedal 64 is being operated, the driver may depress the brake pedal 64 so that the reaction force is increased at a constant rate. In this case, the operating stroke may increase rapidly, and the operating force may approach the two-dot chain line in FIG. 9. In this case, it may be concluded that the operating force, rather than the operating stroke, reflects the intention of the driver, with higher accuracy; therefore, it is desirable to reduce the weight of the operating stroke when determining the required total braking force. When the driver performs an operation to rapidly increase the operating stroke, the rate of increase in the detected value of the stroke sensor 280 may be equal to or larger than a set value, after the switching-time change suppression control is started. Accordingly, when the rate of increase in the detected value of the stroke sensor 280 when the switching-time change suppression control is started is larger than a set rate, the weight α of the operating stroke S may be made smaller than the weight β when the required total braking force Fref is obtained.

While the communication control valve 152 is a solenoid-operated on-off valve in the illustrated embodiment, it may be a solenoid-operated linear control valve. In this case, the opening of the communication control valve 152 is reduced as the operating stroke detected at the start of the switching-time change suppression control is larger. Also, the opening of the communication control valve 152 may be gradually increased so as to be equal to the maximum value (so that the valve is fully opened) after a lapse of the switching-time control duration. The determination time for which it is determined whether there is an abnormality in the communication control valve 152 may be set to be equal to or longer than the switching-time control duration. In this case, an abnormality may be detected after the switching-time change suppression control is completed. Also, an abnormality may be detected, based on a determination as to whether the rate of increase in the detected value of the operating hydraulic pressure sensor 170 is smaller than an abnormality determination threshold value. It is not essential to perform the regeneration coordination control. The present invention may be applied to a hydraulic brake system in which the hydraulic pressures of the brake cylinders 42, 52 are controlled so as to achieve the required total braking force when the master cylinder 66 is in the first state, and the target hydraulic pressure Pref of the back chamber 136 may be determined in any manner. The master cylinder 66 and the back pressure control device 68 may be constructed in any fashion. For example, the hydraulic pressure of the input chamber 140 may be applied to the pilot chamber 210 of the regulator 182, and the stroke simulator 160 may be provided separately from the main body of the master cylinder 66.

It is not essential to perform detection of an abnormality in the communication control valve 152, and make the weight of the operating stroke used when determining the target hydraulic pressure of the back chamber 136 different between the case where the master cylinder 66 is switched from the second state to the first state while the brake pedal 64 is being depressed, and the case where the master cylinder 66 is in the first state at the time when the brake pedal 64 starts being depressed. Also, it is not essential to gradually increase the duty ratio under the switching-time change suppression control. The duty ratio may be constant during the switching-time change suppression control. The invention may be embodied in various forms other than those as described above, with various changes or improvements, based on the knowledge of those skilled in the art to which the invention pertains.

The invention claimed is:

1. A cylinder device, comprising:
a master cylinder provided on a vehicle and including a housing, a pressurizing piston, an input piston and an input chamber, the pressurizing piston being fluid-tightly and slidably fitted in the housing and operable to generate a hydraulic pressure in a front pressurizing chamber, the input piston being linked with a brake operating member and fluid-tightly and slidably fitted in the housing, the input piston being located in the rear of the pressurizing piston, and the input chamber being provided between the input piston and the pressurizing piston; and
a master-cylinder state switching device configured to switch the master cylinder between a first state and a second state, the input piston being allowed to move relative to the pressurizing piston in the first state and the input piston being inhibited from moving relative to the pressurizing piston in the second state, and the master-cylinder state switching device including a switching-time change suppression unit configured to suppress at least one of volumetric change and hydraulic pressure change of the input chamber during switching between the first state and the second state.

2. The cylinder device according to claim 1, wherein:
the pressurizing piston includes a front piston portion and a middle piston portion, the front piston portion is opposed to the front pressurizing chamber, and the middle piston portion is provided in a middle portion of the pressurizing piston and has a larger diameter than a diameter of the front piston portion;

the master cylinder includes an annular chamber provided in front of the middle piston portion;

the master-cylinder state switching device is configured to communicate the input chamber with the annular chamber in the first state, the master-cylinder state switching device is configured to shut off the input chamber from the annular chamber, and the master-cylinder state switching device is configured to communicate the annular chamber with a low-pressure source in the second state; and the switching-time change suppression unit includes an input chamber communication control unit configured to control a condition of communication between the input chamber and the annular chamber when the master cylinder is switched from the second state to the first state.

3. The cylinder device according to claim 2, further comprising:

a connecting passage configured to connect the input chamber with the annular chamber, the connecting passage being connected with the low-pressure source; wherein:

the master-cylinder state switching device includes a communication control valve and a low-pressure source shutoff valve, the communication control valve is provided in a portion of the connecting passage closer to the input chamber than a portion of the connecting passage to which the low-pressure source is connected, the communication control valve is configured to be switchable at least between an open position and a closed position, the low-pressure source shutoff valve is provided between the connecting passage and the low-pressure source, and the low-pressure source shutoff valve is configured to be switchable at least between an open position and a closed position;

the master-cylinder state switching device is configured to place the low-pressure source shutoff valve in the closed position and to place the communication control valve in the open position in the first state, and the master-cylinder state switching device is configured to place the low-pressure source shutoff valve in the open position and to place the communication control valve in the closed position in the second state; and the input chamber communication control unit includes a solenoid valve control unit configured to control the communication control valve while the low-pressure source shutoff valve is in the closed position, so that the condition of communication between the input chamber and the annular chamber is gradually changed from a shut-off condition to a communicating condition.

4. The cylinder device according to claim 2, further comprising:

a connecting passage configured to connect the input chamber with the annular chamber, and to be connected with the low-pressure source, wherein:

the master-cylinder state switching device includes a communication control valve and a low-pressure source shutoff valve, the communication control valve is provided in a portion of the connecting passage closer to the input chamber than a portion of the connecting passage to which the low-pressure source is connected, the communication control valve is configured to be switchable at least between an open position and a closed position, the low-pressure source shutoff valve is provided between the connecting passage and the low-pressure source, and the low-pressure source shutoff valve is configured to be 'switchable at least between an open position and a closed position;

the master-cylinder state switching device is configured to place the low-pressure source shutoff valve in the closed position and to place the communication control valve in the open position in the first state, and the master-cylinder state switching device is configured to place the low-pressure source shutoff valve in the open position and to place the communication control valve in the closed position in the second state;

the input chamber communication control unit includes a communication valve duty control unit configured to switch the communication control valve alternately between the open position and the closed position while the low-pressure source shutoff valve is in the closed position; and the communication valve duty control unit includes a duty-ratio determining unit configured to reduce a duty ratio as a ratio of an open time to a cycle time, the communication control valve being in the open position for the open time, as an operating stroke of the brake operating member at the time of switching from the second state to the first state is larger.

5. The cylinder device according to claim 3, further comprising:

a hydraulic pressure sensor provided in a portion of the connecting passage closer to the annular chamber than the communication control valve; and a communication control valve abnormality detecting unit configured to determine that the communication control valve is in an abnormal condition, in a case where a detected value of the hydraulic pressure sensor is smaller than an abnormality determination threshold value when a determination time elapses from start of control performed by the switching-time change suppression unit.

6. The cylinder device according to claim 5, wherein the master-cylinder state switching device includes a switching unit configured to switch the master cylinder to the second state when an abnormality of the communication control valve is detected by the communication control valve abnormality detecting unit.

7. The cylinder device according to claim 3, further comprising:

a stroke simulator connected to a portion of the connecting passage closer to the annular chamber than a portion of the connecting passage to which the low-pressure source is connected, the stroke simulator being configured to determine operating feeling of the brake operating member.

8. The cylinder device according to claim 1, wherein the master-cylinder state switching device includes a switching command generating unit configured to generate a command to switch the master cylinder from the second state to the first state, in at least one of the case where the brake operating member is operated, and the case where a hydraulic pressure is required to be developed in the front pressurizing chamber.

9. A cylinder device, comprising:

a master cylinder including a housing, a pressurizing piston, an input piston, an input chamber and an annular chamber, the pressurizing piston being fluid-tightly and slidably fitted in the housing and having a front piston portion and a middle piston portion, the front piston portion being provided in a front portion of the pressurizing piston, the middle piston portion being provided in a middle portion of the pressurizing piston and having a larger diameter than a diameter of the front piston portion, the pressurizing piston being operable to generate a hydraulic pressure in a front pressurizing chamber as a pressurizing chamber located in front of the front piston portion; the input piston being linked with a brake operating member and fluid-tightly and slidably fitted in the housing, the input piston being located in the rear of the pressurizing piston; the input chamber being provided between the input piston and the pressurizing piston; and the annular chamber being provided in front of the middle piston portion; and a master-cylinder state switching device configured to switch the master cylinder between a first state and a second state, the input chamber communicating with the annular chamber in the first state, the input chamber being shut off from the annular chamber and the annular chamber communicating with a low-pressure source in the second state, and the master-cylinder state switching device, including a switching-time change suppression unit configured to reduce at least one of volumetric change and hydraulic pressure change of the input chamber during switching from the second state to the first state.

10. A hydraulic brake system, comprising:

the cylinder device according to claim 1;

a brake cylinder hydraulic pressure control device configured to control a hydraulic pressure of the front pressurizing chamber so as to control a hydraulic pressure of each of brake cylinders of hydraulic brakes connected to the front pressurizing chamber and operable to curb rotation of wheels of the vehicle, wherein the pressurizing piston includes a front piston portion, a middle piston portion and a rear small-diameter portion, the front piston portion being opposed to the front pressurizing chamber, the middle piston portion being provided in a middle portion of the pressurizing piston and having a larger diameter than a diameter of the front piston portion, and the rear small-diameter portion being provided at the rear of the middle piston portion and having a smaller diameter than a diameter of the middle piston portion;

the master cylinder includes a back chamber provided at the rear of the middle piston portion; and the brake cylinder hydraulic pressure control device includes a back pressure control device configured to control the hydraulic pressure of the front pressurizing chamber by controlling a hydraulic pressure of the back chamber, the back pressure control device thereby controlling the hydraulic pressure of the brake cylinders.

11. The hydraulic brake system according to claim 10, wherein:

the cylinder device includes a connecting passage connecting the input chamber with the annular chamber;

when the master cylinder is in the first state, the master-cylinder state switching device communicates the input chamber with the annular chamber and communicates the input chamber and the annular chamber with a stroke simulator configured to determine operating feeling of the brake operating member, while shutting off the input chamber and the annular chamber from a low-pressure source;

when the master cylinder is in the second state, the master-cylinder state switching device shuts off the input chamber from the annular chamber, the low-pressure source and the stroke simulator and communicates the annular chamber with the low-pressure source;

the back pressure control device includes a stroke sensor, a hydraulic pressure sensor and a target hydraulic pressure determining unit, the stroke sensor detecting a stroke of the brake operating member, the hydraulic pressure sensor detecting a hydraulic pressure of the annular chamber and the target hydraulic pressure determining unit configured to determine a target hydraulic pressure of the back chamber based on at least one of a detected value of the hydraulic pressure sensor and a detected value of the stroke sensor; and the target hydraulic pressure determining unit includes a different-mode determining unit configured to determine the target hydraulic pressure of the back chamber in different modes, between the case where the master cylinder is switched from the second state to the first state while the brake operating member is being operated, and the case where the master cylinder is in the first state from the time when the brake operating member starts being operated.

\* \* \* \* \*